US012298711B2

(12) United States Patent
Sakamoto et al.

(10) Patent No.: US 12,298,711 B2
(45) Date of Patent: May 13, 2025

(54) TONER FOR DEVELOPING ELECTROSTATIC CHARGE IMAGE, ELECTROSTATIC CHARGE IMAGE DEVELOPER, TONER CARTRIDGE, PROCESS CARTRIDGE, AND IMAGE FORMING APPARATUS

(71) Applicant: FUJIFILM Business Innovation Corp., Tokyo (JP)

(72) Inventors: Shinya Sakamoto, Kanagawa (JP); Daisuke Ishizuka, Kanagawa (JP); Keita Yamamoto, Kanagawa (JP); Eiji Kawakami, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 652 days.

(21) Appl. No.: 17/705,721

(22) Filed: Mar. 28, 2022

(65) Prior Publication Data

US 2023/0095496 A1 Mar. 30, 2023

(30) Foreign Application Priority Data

Sep. 27, 2021 (JP) ................................ 2021-157173

(51) Int. Cl.
*G03G 9/087* (2006.01)

(52) U.S. Cl.
CPC ..... *G03G 9/08786* (2013.01); *G03G 9/08704* (2013.01); *G03G 9/08711* (2013.01); *G03G 9/08755* (2013.01); *G03G 9/08797* (2013.01)

(58) Field of Classification Search
CPC .......... G03G 9/08755; G03G 9/08711; G03G 9/08797; G03G 9/08704; G03G 9/08786; G03G 9/08788; G03G 9/08782
See application file for complete search history.

(56) References Cited

U.S. PATENT DOCUMENTS

| | | | | |
|---|---|---|---|---|
| 9,969,834 | B2 * | 5/2018 | Ohtsu ................ | G03G 9/08782 |
| 10,234,777 | B2 | 3/2019 | Ohtsu et al. | |
| 2017/0269493 | A1 * | 9/2017 | Ohtsu ................ | G03G 9/08726 |

FOREIGN PATENT DOCUMENTS

| | | |
|---|---|---|
| JP | 2017-45048 A | 3/2017 |
| JP | 2017-167343 A | 9/2017 |

(Continued)

*Primary Examiner* — Brandy S Lee
*Assistant Examiner* — Jenna Kuipers
(74) *Attorney, Agent, or Firm* — Sughrue Mion, PLLC

(57) ABSTRACT

A toner for developing an electrostatic charge image incorporates toner particles that contain binder resins including an amorphous polyester resin and a crystalline polyester resin, an ester-based release agent, and a polycondensate of a styrene-acrylic resin and a polyolefin resin. The polycondensate of styrene-acrylic and polyolefin resins has a storage modulus $G'_{SP}$ (70) at 70° C. of $1\times10^4$ Pa or more and $1\times10^7$ Pa or less and a storage modulus $G'_{SP}$ (90) at 90° C. of $1\times10^3$ Pa or more and $1\times10^6$ Pa or less in dynamic rheometry. The toner particles have a storage modulus $G'_T$ (70) at 70° C. of $1\times10^4$ Pa or more and $1\times10^6$ Pa or less and a storage modulus $G'_T$ (90) at 90° C. of $1\times10^3$ Pa or more and $1\times10^5$ Pa or less in dynamic rheometry.

17 Claims, 2 Drawing Sheets

(56) References Cited

FOREIGN PATENT DOCUMENTS

| | | | | |
|---|---|---|---|---|
| JP | 2018-112688 | A | | 7/2018 |
| JP | 2019020690 | A | * | 2/2019 |

* cited by examiner

TONER FOR DEVELOPING ELECTROSTATIC CHARGE IMAGE, ELECTROSTATIC CHARGE IMAGE DEVELOPER, TONER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-157173 filed Sep. 27, 2021.

BACKGROUND

(i) Technical Field

The present disclosure relates to a toner for developing an electrostatic charge image, an electrostatic charge image developer, a toner cartridge, a process cartridge, and an image forming apparatus.

(ii) Related Art

Electrophotography and other techniques for visualizing image information are used in various fields today. In electrophotographic visualization of image information, the surface of an image carrier is charged, and an electrostatic charge image, which is the image information, is created thereon. Then a developer, which contains toner, is applied to form a toner image on the surface of the image carrier. This toner image is transferred to a recording medium and fixed on the recording medium.

For example, Japanese Unexamined Patent Application Publication No. 2018-112688 discloses "a toner comprising toner particles each containing an amorphous polyester resin, a crystalline polyester resin, wax, and a wax dispersant, wherein the wax dispersant is a polymer having a styrene-acrylic polymer portion having a particular unit and a polyolefin portion, and the wax is a particular ester compound or behenyl stearate."

Japanese Unexamined Patent Application Publication No. 2017-045048 discloses "a wax dispersant for a toner comprising a polymer in which a styrene acrylic resin is graft-polymerized with a hydrocarbon compound, wherein the styrene acrylic resin includes a structural part derived from a saturated alicyclic compound; and a toner including toner particles containing a polymer in which a styrene acrylic resin is graft-polymerized with a hydrocarbon compound, binder resin, and wax, wherein the styrene acrylic resin includes a structural part derived from a saturated alicyclic compound."

Japanese Unexamined Patent Application Publication No. 2017-167343, furthermore, discloses "a toner obtained by heat treating a toner particle containing a crystalline polyester resin, an amorphous polyester resin, a hydrocarbon wax and a wax dispersant, wherein the crystalline polyester resin is a hybrid resin having crystalline polyester segments and amorphous vinyl segments, and a mass ratio of the crystalline polyester segments and the amorphous vinyl segments in the crystalline polyester resin (crystalline segments/amorphous segments) is 70/30 to 98/2."

SUMMARY

Aspects of non-limiting embodiments of the present disclosure relate to a toner, for developing an electrostatic charge image, that incorporates toner particles containing binder resins including amorphous and crystalline polyester resins, an ester-based release agent, and a polycondensate of styrene-acrylic and polyolefin resins. This toner may be fixable at low temperatures and may help reduce variations in gloss after postprocessing of the fixed toner image at the same time, compared with those that violate at least one of conditions (1) to (3):

condition (1), the toner particles have a storage modulus $G'_T$ (70) at 70° C. of $1\times10^4$ Pa or more and $1\times10^6$ Pa or less and a storage modulus $G'_T$ (90) at 90° C. of $1\times10^3$ Pa or more and $1\times10^5$ Pa or less in dynamic rheometry;

condition (2), the polycondensate of styrene-acrylic and polyolefin resins has a storage modulus $G'_{SP}$ (70) at 70° C. of $1\times10^4$ Pa or more and $1\times10^7$ Pa or less in dynamic rheometry; and condition (3), the polycondensate of styrene-acrylic and polyolefin resins has a storage modulus $G'_{SP}$ (90) at 90° C. of $1\times10^3$ Pa or more and $1\times10^6$ Pa or less in dynamic rheometry.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a toner for developing an electrostatic charge image, the toner incorporating toner particles that contain binder resins including an amorphous polyester resin and a crystalline polyester resin, an ester-based release agent, and a polycondensate of a styrene-acrylic resin and a polyolefin resin, wherein: the toner particles have a storage modulus $G'_T$ (70) at 70° C. of $1\times10^4$ Pa or more and $1\times10^6$ Pa or less and a storage modulus $G'_T$ (90) at 90° C. of $1\times10^3$ Pa or more and $1\times10^5$ Pa or less in dynamic rheometry; and the polycondensate of styrene-acrylic and polyolefin resins has a storage modulus $G'_{SP}$ (70) at 70° C. of $1\times10^4$ Pa or more and $1\times10^7$ Pa or less and a storage modulus $G'_{SP}$ (90) at 90° C. of $1\times10^3$ Pa or more and $1\times10^6$ Pa or less in dynamic rheometry.

BRIEF DESCRIPTION OF THE DRAWINGS

Exemplary embodiments of the present disclosure will be described in detail based on the following figures, wherein.

DETAILED DESCRIPTION

Figure 1:
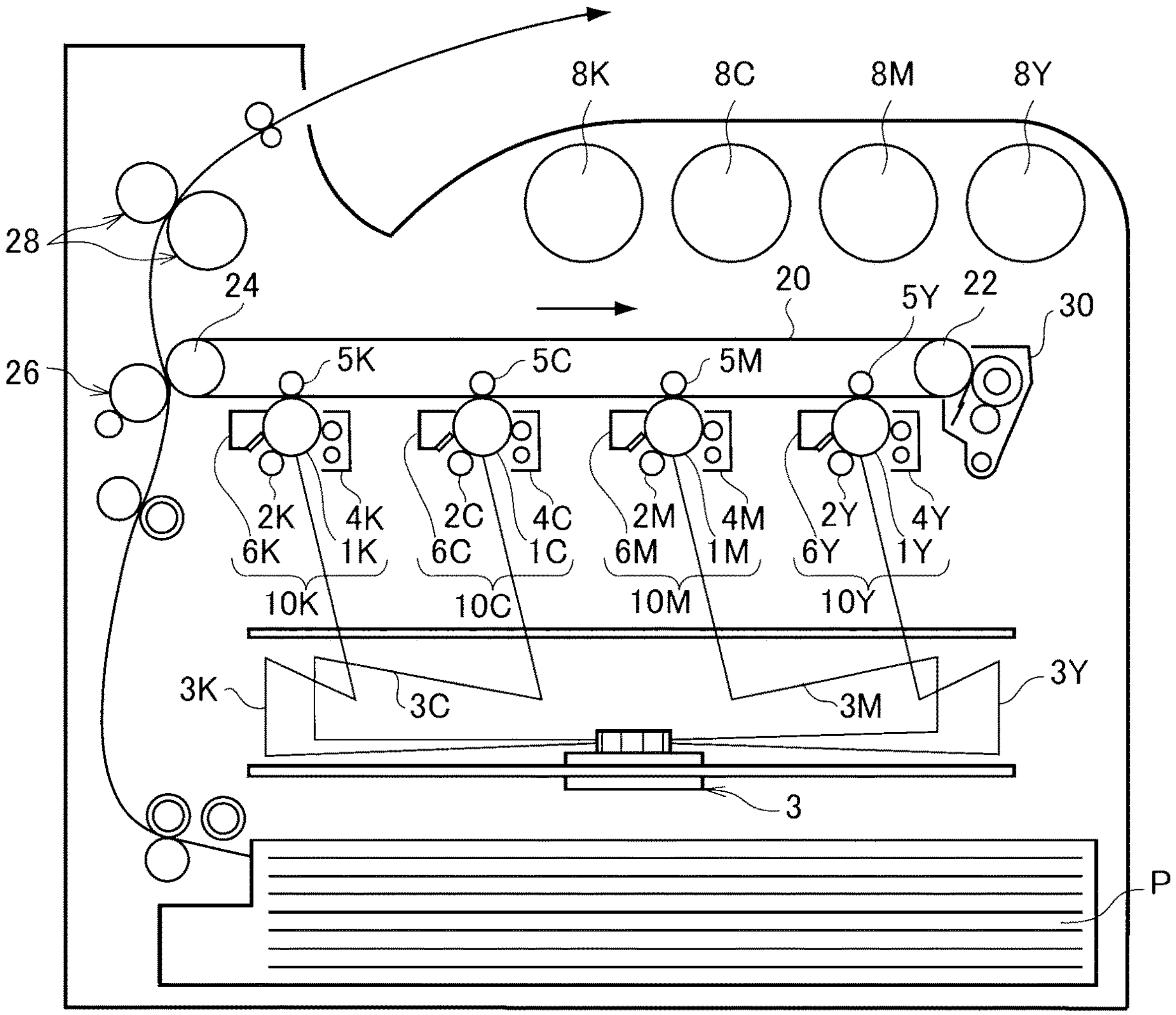
FIG. 1 is a schematic view of the structure of an example of an image forming apparatus according to an exemplary embodiment.

The following describes exemplary embodiments of the present disclosure. The following description and Examples are merely examples of the disclosure and do not limit the scope of the disclosure.

The following description includes series of numerical ranges. In such a series, the upper or lower limit of a numerical range may be substituted with that of another in the same series. The upper or lower limit of a numerical range, furthermore, may be substituted with a value indicated in the Examples section.

A gerund or action noun used in relation to a certain process or method herein does not always represent an independent action. As long as its purpose is fulfilled, the action represented by the gerund or action noun may be continuous with or part of another.

A description of an exemplary embodiment herein may make reference to drawing(s). The reference, however, does not mean what is illustrated is the only possible configuration of the exemplary embodiment. The size of elements in each drawing is conceptual; the relative sizes of the elements do not need to be as illustrated.

An ingredient herein may be a combination of multiple substances. If a composition described herein contains a combination of multiple substances as one of its ingredients, the amount of the ingredient represents the total amount of the substances in the composition unless stated otherwise.

An ingredient herein, furthermore, may be a combination of multiple kinds of particles. If a composition described herein contains a combination of multiple kinds of particles as one of its ingredients, the diameter of particles of the ingredient is that of the mixture of the multiple kinds of particles present in the composition unless stated otherwise.

In the present disclosure, "toner for developing an electrostatic charge image" may be referred to simply as "toner." "An electrostatic charge image developer," likewise, may be referred to simply as "a developer."

"A polycondensate of a styrene-acrylic resin and a polyolefin resin," furthermore, may be referred to as "a StAc-PO polycondensate."

Toner for Developing an Electrostatic Charge Image

Toner according to an exemplary embodiment incorporates toner particles that contain binder resins including an amorphous polyester resin and a crystalline polyester resin, an ester-based release agent, and a polycondensate of a styrene-acrylic resin and a polyolefin resin.

In addition to this, the toner according to this exemplary embodiment meets conditions (1) to (3):

condition (1), the toner particles have a storage modulus $G'_T(70)$ at 70° C. of $1\times10^4$ Pa or more and $1\times10^6$ Pa or less and a storage modulus $G'_T(90)$ at 90° C. of $1\times10^3$ Pa or more and $1\times10^5$ Pa or less in dynamic rheometry;

condition (2), the polycondensate of styrene-acrylic and polyolefin resins has a storage modulus $G'_{SP}(70)$ at 70° C. of $1\times10^4$ Pa or more and $1\times10^7$ Pa or less in dynamic rheometry; and condition (3), the polycondensate of styrene-acrylic and polyolefin resins has a storage modulus $G'_{SP}(90)$ at 90° C. of $1\times10^3$ Pa or more and $1\times10^6$ Pa or less in dynamic rheometry.

The toner according to this exemplary embodiment may further meet conditions (4) to (6):

condition (4), the difference between the common logarithms of the storage modulus $G'_{SP}(70)$ at 70° C. and the storage modulus $G'_{SP}(90)$ at 90° C. of the polycondensate of styrene-acrylic and polyolefin resins in dynamic rheometry ($\mathrm{Log}_{10}G'_{SP}(70)-\mathrm{Log}_{10}G'_{SP}(90)$) is 1.0 or more and 4.0 or less;

condition (5), the difference between the common logarithms of the storage modulus $G'_{SP}(70)$ at 70° C. of the polycondensate of styrene-acrylic and polyolefin resins in dynamic rheometry and the storage modulus $G'_T(70)$ at 70° C. of the toner particles in dynamic rheometry ($\mathrm{Log}_{10}G'_T(70)-\mathrm{Log}_{10}G'_{SP}(70)$) is −3.0 or more and 2.0 or less; and condition (6), the difference between the common logarithms of the storage modulus $G'_{SP}(90)$ at 90° C. of the polycondensate of styrene-acrylic and polyolefin resins in dynamic rheometry and the storage modulus $G'_T(90)$ at 90° C. of the toner particles in dynamic rheometry ($\mathrm{Log}_{10}G'T(90)-\mathrm{Log}_{10}G'_{SP}(90)$) is −3.0 or more and 2.0 or less.

Configured as described above, the toner according to this exemplary embodiment may be fixable at low temperatures and may help reduce variations in gloss after postprocessing of the fixed toner image at the same time. A possible reason is as follows.

In the related art, researchers have sought to achieve low-temperature fixation of toner by using a combination of amorphous and crystalline polyester resins as binder resins for toner particles.

Meanwhile, a release agent has been mixed into toner particles to ensure the toner will come off the fixing element during fixation. In fused toner, the release agent will be less viscous than the other materials in the toner particles (hereinafter, the materials in toner particles excluding the release agent may be referred to as "the rest").

In fixing at relatively high temperatures, the rest melts together with the release agent, losing viscosity in the toner. It is, therefore, unlikely that the release agent precedes the rest in melting and leaching out of the toner particles when the toner is fused.

In fixing at low temperatures, however, the release agent melts and loses viscosity when the toner is fused, but the rest does not; part of it remains solid, and the decrease in viscosity is also insufficient. It is, therefore, likely that the release agent precedes the rest in melting and leaching out of the toner particles when the toner is fused.

The amount and rate of leaching of the release agent have impact on the surface condition of the fixed image, which means the surface condition of the fixed image is unstable particularly when an image is fixed at high temperatures in some instances and at low temperatures in others, the case in which the leaching behavior of the release agent varies greatly. For example, in continuous printing on thick paper as a recording medium, the surface condition of the fixed image is different between the first sheet and after hundreds of sheets because of a difference in fixing temperature. Postprocessing of the fixed toner image in that case will cause variations in gloss.

In this context, the postprocessing refers to treatments the fixed toner image undergoes through a postprocessing system, including varnishing the fixed image and cutting the recording medium.

To undergo the postprocessing, a recording medium with the fixed image thereon is transported by transport rollers. The fixed image, therefore, comes into contact with the rollers or rubs against them by sliding thereon. Since the release agent has a relatively low hardness at room temperature (e.g., 25° C.), the contact or rubbing causes the surface of the fixed image to slightly deform if much release agent has leached out to the surface of the fixed image. As a result, the gloss in the portions of the fixed image touched or rubbed by the transport rollers changes, and viewers will perceive these changes as variations in gloss.

The changes in the gloss of the fixed image are attributable to a difference between the melt viscosity of the release agent and that of the rest in the toner particles at low temperatures and may be addressed by making this difference small. Doing this, however, will compromise releasability, the intended advantage of the release agent. The toner in that case does not come off the fixing element well, and the resulting image tends to be rough.

Using a polyester binder resin with an ester-based release agent will prevent, to some extent, the situation in which only the release agent leaches out of the toner particles because high compatibility between the two materials helps the ester-based release agent disperse in the toner particles well. The fixed image in that case, however, may be somewhat weak due to insufficient phase separation between the polyester resin and the ester-based release agent inside the image. When such a fixed image comes into contact with transport rollers or rubs against them by sliding thereon, the surface of the fixed image deforms slightly. As a result, the gloss in the portions of the fixed image touched or rubbed by the transport rollers changes, and viewers will perceive these changes as variations in gloss.

StAc-PO polycondensates are highly compatible with the ester bond moiety of polyester binder resins and ester-based release agents by virtue of polar ester bonds in their styrene-acrylic resin moiety, while being highly compatible with the highly crystalline, methylene chain moiety of crystalline polyester resins and ester-based release agents owing to their low-polarity polyolefin resin moiety. StAc-PO polycondensates, therefore, are good dispersants.

When toner particles are produced with an ester-based release agent, mixing in a StAc-PO polycondensate and allowing it to act as a dispersant will help the release agent disperse well inside the toner particles (i.e., unfixed toner particles). If the fixation is at low temperatures, however, the ester-based release agent becomes less dispersible and easily aggregates during fusion. The fixed image, therefore, will be nonuniform in terms of the dispersion of the ester-based release agent therein, and the leaching behavior of the ester-based release agent will vary from part to part inside the fixed image. In this case, too, postprocessing of the fixed toner image will cause variations in gloss. During the low-temperature fixation, the melt viscosity of the release agent decreases first, and then, the inventors believe, the melt viscosity of the StAc-PO polycondensate drops too fast and too much before that of the binder resin falls. It appears that this extreme drop in melt viscosity affects the dispersing function of the StAc-PO polycondensate.

To address this, the toner according to this exemplary embodiment is made with amorphous and crystalline polyester binder resins so that it may be fixed at low temperatures.

In addition to this, the toner particles, a component of the toner according to this exemplary embodiment, has a storage modulus $G'_T$ (70) at 70° C. and a storage modulus $G'_T$ (90) at 90° C. in respective particular ranges, and the StAc-PO polycondensate, another component, has a storage modulus $G'_{SP}$ (70) at 70° C. and a storage modulus $G'_{SP}$ (90) at 90° C. in respective particular ranges at the same time.

The following parameters, furthermore, may be in respective particular ranges: the difference between the storage modulus $G'_{SP}$ (70) at 70° C. and the storage modulus $G'_{SP}$ (90) at 90° C. of the StAc-PO polycondensate, the difference between the storage modulus $G'_{SP}$ (70) at 70° C. of the StAc-PO polycondensate and the storage modulus $G'_T$ (70) at 70° C. of the toner particles, and the difference between the storage modulus $G'_{SP}$ (90) at 90° C. of the StAc-PO polycondensate and the storage modulus $G'_T$ (90) at 90° C. of the toner particles.

That is, the toner according to this exemplary embodiment may be configured so that the StAc-PO polycondensate loses its melt viscosity to a degree similar to the binder resins.

When the toner is fixed at low temperatures, the inventors believe, these may ensure that the StAc-PO polycondensate will lose its melt viscosity at a moderate rate, intermediate between that of the ester-based release agent and the binder resins. The StAc-PO polycondensate, furthermore, will surround the ester-based release agent that has lost its melt viscosity, thereby limiting an apparent decrease in the viscosity of the ester-based release agent. The ester-based release agent, therefore, may be kept dispersed.

As a result, the nonuniformity of dispersion of the ester-based release agent in fixation (i.e., during fusion) at low temperatures may be limited, and the leaching behavior of the ester-based release agent inside the fixed image may be uniform.

Presumably for these reasons, the toner according to this exemplary embodiment, configured as described above, may be fixable at low temperatures and may help reduce variations in gloss after postprocessing of the fixed toner image at the same time.

The following describes the toner according to this exemplary embodiment in detail.

The toner according to this exemplary embodiment incorporates toner particles. The toner may incorporate external additives, i.e., additives present in the toner but outside the toner particles.

Toner Particles

The toner particles contain binder resins including an amorphous polyester resin and a crystalline polyester resin, an ester-based release agent, and a polycondensate of a styrene-acrylic resin and a polyolefin resin. The toner particles may contain coloring agent(s) and/or other additives.

Dynamic Viscoelasticity

Storage Modulus

The toner particles have a storage modulus $G'_T$ (70) at 70° C. of $1\times10^4$ Pa or more and $1\times10^6$ Pa or less in dynamic rheometry. For better fixation at low temperatures and smaller variations in gloss after postprocessing, $G'_T$ (70) may be $5.0\times10^4$ Pa or more and $5.0\times10^5$ Pa or less.

The toner particles, furthermore, have a storage modulus $G'_T$ (90) at 90° C. of $1\times10^3$ Pa or more and $1\times10^5$ Pa or less in dynamic rheometry. For better fixation at low temperatures and smaller variations in gloss after postprocessing, $G'_T$ (90) may be $5.0\times10^3$ Pa or more and $5.0\times10^4$ Pa or less.

The StAc-PO polycondensate has a storage modulus $G'_{SP}$ (70) at 70° C. of $1\times10^4$ Pa or more and $1\times10^7$ Pa or less in dynamic rheometry. For better fixation at low temperatures and smaller variations in gloss after postprocessing, $G'_{SP}$ (70) may be $5.0\times10^5$ Pa or more and $5.0\times10^6$ Pa or less.

The StAc-PO polycondensate, furthermore, has a storage modulus $G'_{SP}$ (90) at 90° C. of $1\times10^3$ Pa or more and $1\times10^6$ Pa or less in dynamic rheometry. For better fixation at low temperatures and smaller variations in gloss after postprocessing, $G'_{SP}$ (90) may be $1\times10^4$ Pa or more and $1\times10^5$ Pa or less.

For better fixation at low temperatures and smaller variations in gloss after postprocessing, the difference between the common logarithms of the storage modulus $G'_{SP}$ (70) at 70° C. and the storage modulus $G'_{SP}$ (90) at 90° C. of the StAc-PO polycondensate in dynamic rheometry ($Log_{10}G'_{SP}$ (70)−$Log_{10}G'_{SP}$ (90)) may be 1.0 or more and 4.0 or less. Preferably, this difference is 1.5 or more and 3.0 or less.

For better fixation at low temperatures and smaller variations in gloss after postprocessing, the difference between the common logarithms of the storage modulus $G'_{SP}$ (70) at 70° C. of the StAc-PO polycondensate in dynamic rheometry and the storage modulus $G'_T$ (70) at 70° C. of the toner particles in dynamic rheometry ($Log_{10}G'_T$ (70)−$Log_{10}G'_{SP}$ (70)) may be −3.0 or more and 2.0 or less. Preferably, this difference is −1.5 or more and 1.0 or less.

For better fixation at low temperatures and smaller variations in gloss after postprocessing, furthermore, the difference between the common logarithms of the storage modulus $G'_{SP}$ (90) at 90° C. of the StAc-PO polycondensate in dynamic rheometry and the storage modulus $G'_T$ (90) at 90° C. of the toner particles in dynamic rheometry ($Log_{10}G'T$ (90)−$Log_{10}G'_{SP}$ (90)) may be −3.0 or more and 2.0 or less. Preferably, this difference is −1.5 or more and 1.0 or less.

Loss Tangent tan δ

For smaller variations in gloss after postprocessing, it may be that 10≤|Td−Tw|≤30, preferably 13|Td−Tw|≤27, more preferably, 17≤|Td−Tw|≤23, where Td represents the temperature in dynamic rheometry of the toner particles at which the loss tangent tan δ of the toner particles peaks, and Tw represents the melting temperature of the ester-based release agent.

During fixation, the melt viscosity of the toner particles falls at "the temperature Td at which the loss tangent tan δ peaks," and that of the ester-based release agent drops at "the melting temperature." Making the difference therebetween in any of the above ranges may help encourage the reduction of variations in gloss after postprocessing of the fixed toner image. In that case the ester-based release agent is kept dispersed during fixation (i.e., during fusion) more easily, and the leaching behavior of the ester-based release agent inside the fixed image tends to be more uniform.

For smaller variations in gloss after postprocessing, the temperature Td in dynamic rheometry of the toner particles at which the loss tangent tan δ of the toner particles peaks may be 40° C. or above and 70° C. or below, preferably 45° C. or above and 65° C. or below, more preferably 49° C. or above and 61° C. or below.

The storage moduli G's at the specified temperatures of the toner particles and the StAc-PO polycondensate and the temperature Td at which the loss tangent tan δ of the toner particles peaks are measured by dynamic rheometry using a rheometer.

Specifically, the toner particles (or those with external additive(s)) of interest are shaped into tablets at room temperature (25° C.) using a press machine. The polycondensate of styrene-acrylic and polyolefin resins of interest is also shaped in the same way. The resulting samples for measurement are analyzed by dynamic rheometry using a rheometer under the following conditions. On the storage modulus and loss modulus curves, the storage moduli G's at the specified temperatures and the temperature Td at which the loss tangent tan δ peaks are read.

Measurement Conditions

Analyzer: ARES rheometer (TA Instruments)

Measuring system: 8-mm parallel plates

Gap between the plates: Adjusted to 3 mm

Frequency: 1 Hz (constant)

Measuring temperature: Temperature elevated from 25° C. to the maximum of 150° C.

Strain: Automatically controlled between 0.1% and 50%

Rate of temperature elevation: 2° C./min

The storage moduli G's at the specified temperatures and temperature Td at which the loss tangent tan δ peaks of the toner particles can be controlled by those of the binder resins. The storage moduli G's at the specified temperatures and temperature Td at which the loss tangent tan δ peaks of the binder resins can be controlled by customizing the proportions of materials, the initiator loading, the duration of polymerization, etc.

Likewise, the storage moduli G's at the specified temperatures of the StAc-PO polycondensate, can be controlled by customizing the proportions of materials, the crosslinker material, the initiator loading, the duration of polymerization, etc.

Solubility Parameters

For smaller variations in gloss after postprocessing, it may be that 0.8≤|SP1−SP2|≤, preferably 0.85≤|SP1−SP2|≤1.15, more preferably 0.90≤|SP1−SP2|≤1.1, where SP1 represents the solubility parameter of the styrene-acrylic resin in the StAc-PO polycondensate, and SP2 represents the average solubility parameter of the amorphous and crystalline polyester resins.

A combination of a solubility parameter SP1 of the styrene-acrylic resin in the StAc-PO polycondensate and an average solubility parameter SP2 of the amorphous and crystalline polyester resins that meets any of these conditions may help encourage the reduction of variations in gloss after postprocessing of the fixed toner image. In that case the ester-based release agent tends to be less likely to leach out inside the fixed image by virtue of high compatibility between the StAc-PO polycondensate and the amorphous and crystalline polyester resins.

For smaller variations in gloss after postprocessing, it may be that 1.0≤|SP2−SP3 Å≤1.3, preferably 1.05≤|SP2−SP3 Å≤1.25, where SP2 represents the average solubility parameter of the amorphous and crystalline polyester resins, and SP3 represents the solubility parameter of the ester-based release agent.

A combination of an average solubility parameter SP2 of the amorphous and crystalline polyester resins and a solubility parameter SP3 of the ester-based release agent that meets any of these conditions may help encourage the reduction of variations in gloss after postprocessing of the fixed toner image. In that case the ester-based release agent tends to be less likely to leach out inside the fixed image by virtue of high compatibility between the amorphous and crystalline polyester resins and the ester-based release agent.

For smaller variations in gloss after postprocessing, the solubility parameter SP1 of the styrene-acrylic resin in the StAc-PO polycondensate may be 8.0 or more and 10.0 or less. Preferably, SP1 is 8.2 or more and 9.8 or less, more preferably 8.4 or more and 9.6 or less.

Likewise, for smaller variations in gloss after postprocessing, the average solubility parameter SP2 of the amorphous and crystalline polyester resins may be 9.0 or more and 10.0 or less. Preferably, SP2 is 9.2 or more and 9.8 or less, more preferably 9.3 or more and 9.7 or less.

For smaller variations in gloss after postprocessing, furthermore, the solubility parameter SP3 of the ester-based release agent may be 8.0 or more and 9.0 or less. Preferably, SP3 is 8.2 or more and 8.7 or less, more preferably 8.3 or more and 8.5 or less.

The solubility parameters SP and that of the binder resins SP (unit, $(cal/cm^3)^{1/2}$) can be measured according to Okitsu. The details of the method are described in the *Journal of the Adhesion Society of Japan*, vol. 29, no. 5 (1993) (in Japanese).

Amounts of the Ingredients

For better fixation at low temperatures and smaller variations in gloss after postprocessing, the ratio by mass between the total amorphous and crystalline polyester resins content $C_{AC}$ and the StAc-PO polycondensate content $C_{SP}$ ($C_{SP}/C_{AC}$) may be 0.1 or more and 0.35 or less. Preferably, this ratio is 0.15 or more and 0.30 or less.

For better fixation at low temperatures and smaller variations in gloss after postprocessing, the ratio by mass between the ester-based release agent content $C_W$ and the StAc-PO polycondensate content $C_{SP}$ ($C_{SP}/C_W$) may be 1.0 or more and 8.0 or less. Preferably, this ratio is 2.0 or more and 7.0 or less, more preferably 2.5 or more and 4.0 or less.

For smaller variations in gloss after postprocessing, the total amorphous and crystalline polyester resins content $C_{AC}$ may be 50% by mass or more and 90% by mass or less of the toner particles. Preferably, $C_{AC}$ is 60% by mass or more and 80% by mass or less, more preferably 65% by mass or more and 75% by mass or less, of the toner particles.

For better fixation at low temperatures and smaller variations in gloss after postprocessing, the crystalline polyester resin content $C_C$ may be 4% by mass or more and 30% by mass or less of the toner particles. Preferably, $C_C$ is 6% by mass or more and 25% by mass or less, more preferably 8% by mass or more and 22% by mass or less, even more preferably 10% by mass or more and 18% by mass or less of the toner particles.

For smaller variations in gloss after postprocessing, the ester-based release agent content $C_W$ may be 3% by mass or more and 10% by mass or less of the toner particles. Preferably, $C_W$ is 4% by mass or more and 9% by mass or less of the toner particles.

For smaller variations in gloss after postprocessing, furthermore, the StAc-PO polycondensate content $C_{SP}$ may be 2% by mass or more and 25% by mass or less of the toner particles. Preferably, $C_{SP}$ is 5% by mass or more and 20% by mass or less, more preferably 10% by mass or more and 20% by mass or less, even more preferably 13% by mass or more and 18% by mass or less of the toner particles.

Diameter of Domains of the Ester-Based Release Agent

For better fixation at low temperatures and smaller variations in gloss after postprocessing, the diameter of domains of the ester-based release agent in a cross-sectional observation of the toner particles may be 100 nm or more and 800 nm or less, preferably 200 nm or more and 700 nm or less, more preferably 300 nm or more and 600 nm or less.

"The diameter of domains of the release agent" in this context refers to the longest diameter of the domains of the release agent (i.e., the longest length of a segment between two points on the contour of a cross-section of a domain of the release agent).

Making the diameter of domains of the ester-based release agent 100 nm or more may help prevent the effects of the StAc-PO polycondensate, which functions as a dispersant for the release agent, from being too strong. In that case the area of the interfaces between domains of the ester-based release agent and those of the StAc-PO polycondensate is not excessively large.

Making the diameter of domains of the ester-based release agent 800 nm or less, on the other hand, may help ensure the StAc-PO polycondensate will function properly as a dispersant for the release-agent. In that case the area of the interfaces between domains of the ester-based release agent and those of the StAc-PO polycondensate is not excessively small.

Overall, a diameter of domains of the ester-based release agent in any of the above ranges may help encourage the reduction of variations in gloss after postprocessing of the fixed toner image The measurement of the diameter of domains of the release agent can be as follows.

A portion of the toner particles (or those with external additive(s)) is mixed into epoxy resin, and the epoxy resin is cured. The resulting solid is sliced using an ultramicrotome (Leica Ultracut UCT) to give a thin specimen having a thickness of 80 nm or more and 130 nm or less. The specimen is stained with ruthenium tetroxide for 3 hours in a desiccator at 30° C. A STEM image (acceleration voltage, 30 kV; magnification, 20000) of the stained specimen is obtained through transmission imaging using an ultrahigh-resolution field-emission scanning electron microscope (FE-SEM; Hitachi High-Technologies S-4800).

Then domains in the imaged toner particles are identified as to which material they are of, the release agent or resins, by looking at their contrast and shape. In SEM images, binder resins, rich in double bonds, appear stained darker with ruthenium tetroxide than other materials, such as a release agent, and amorphous resins appear stained darker than crystalline ones. This allows for distinction between domains of binder resins and other materials and between domains of crystalline and amorphous resins.

That is, domains of the release agent are stained the lightest with ruthenium, those of crystalline resins (e.g., the crystalline polyester resin) the second lightest, and those of amorphous resins (e.g., the amorphous polyester resin) are stained the darkest. The contrast may be adjusted to make domains of the release agent look white, those of amorphous resins look black, and those of crystalline resins look light gray. Now each domain can be identified by color.

Then the ruthenium-stained domains of the release agent are analyzed on the image. The longest diameter of domains of the release agent is measured on ten toner particles, and the measured diameters are arithmetically averaged.

It should be noted that the toner particles in the SEM image usually have cross-sections in different sizes. Of such cross-sections, those having a diameter of 85% or more of the volume-average diameter of the toner particles are chosen for observation.

Percentage Area of the Ester-Based Release Agent

For smaller variations in gloss after postprocessing, the percentage area of the ester-based release agent in the surface layer of the toner particles in a cross-sectional observation of the toner particles may be 10% or less, preferably 8% or less, more preferably 6% or less. As for the lower limit, the percentage area of the ester-based release agent may even be 0%, but usually is 2% or more, for example, for production reasons.

Making the percentage area of the ester-based release agent in the surface layer of the toner particles 10% or less may help encourage the reduction of variations in gloss after postprocessing of the fixed toner image. In that case the ester-based release agent is less likely to leach out inside the fixed image.

The measurement of the percentage area of the release agent can be as follows.

In the SEM image to be used in measuring the diameter of domains of the release agent, cross-sections of toner particles having a diameter of 85% or more of the volume-average diameter of the toner particles are chosen. The stained domains of the release agent are observed in each toner particle, and the area of all domains in the particle and that of the domains present in the surface layer, from the surface to a depth of 1000 nm, of the particle are determined. The ratio between the two areas (area of the domains of the release agent present in the surface layer of the toner particle/area of all domains of the release agent in the toner particle) is calculated. The average of 100 toner particles is reported as the percentage area of the release agent.

Constituents of the Toner Particles Binder Resins

The binder resins include an amorphous polyester resin and a crystalline polyester resin.

The ratio by mass between the amorphous and crystalline polyester resins (crystalline resin/amorphous resin) may be 3/97 or more and 50/50 or less, preferably 7/93 or more and 30/70 or less.

The term amorphous polyester resin herein refers to a polyester resin that, in a thermal analysis by differential scanning calorimetry (DSC), only shows stepwise endothermic changes, instead of a clear endothermic peak. The resin is solid at room temperature and thermoplasticizes at temperatures equal to or higher than its glass transition temperature.

A crystalline resin, on the other hand, shows a clear endothermic peak rather than stepwise endothermic changes in differential scanning calorimetry (DSC).

Specifically, being a crystalline polyester resin, for example, means its endothermic peak as measured at a heating rate of 10° C./min has a full width at half maximum of 10° C. or narrower, whereas an amorphous resin represents one with which the full width at half maximum is broader than 10° C. or that shows no clear endothermic peak.

The amorphous polyester resin may be described as follows.

An example of an amorphous polyester resin is a polycondensate of polycarboxylic acid(s) and polyhydric alcohol(s). Either commercially available or synthesized amorphous polyester resins may be used.

Examples of polycarboxylic acids include aliphatic dicarboxylic acids (e.g., oxalic acid, malonic acid, maleic acid, fumaric acid, citraconic acid, itaconic acid, glutaconic acid, succinic acid, alkenylsuccinic acids, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, and naphthalenedicarboxylic acid), and anhydrides and lower-alkyl (e.g., C1 to C5 alkyl) esters thereof. Of these, aromatic dicarboxylic acids are preferred.

A combination of a dicarboxylic acid and a crosslinked or branched carboxylic acid having three or more carboxylic groups may also be used. Examples of carboxylic acids having three or more carboxylic groups include trimellitic acid, pyromellitic acid, and anhydrides and lower-alkyl (e.g., C1 to C5 alkyl) esters thereof.

One polycarboxylic acid may be used alone, or two or more may be used in combination.

Examples of polyhydric alcohols include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexanedimethanol, and hydrogenated bisphenol A), and aromatic diols (e.g., ethylene oxide adducts of bisphenol A and propylene oxide adducts of bisphenol A). Of these, aromatic diols and alicyclic diols are preferred, and aromatic diols are more preferred.

A combination of a diol and a crosslinked or branched polyhydric alcohol having three or more hydroxyl groups may also be used. Examples of polyhydric alcohols having three or more hydroxyl groups include glycerol, trimethylolpropane, and pentaerythritol.

One polyhydric alcohol may be used alone, or two or more may be used in combination.

The production of the amorphous polyester resin, if produced, can be by known methods. A specific example is to polymerize the raw materials at a temperature of 180° C. or above and 230° C. or below, optionally at reduced pressure so that the water and alcohol produced with the condensation will leave. A high-boiling solvent may be added as a solubilizer to make soluble any raw-material monomer insoluble or not miscible with the other(s) at the reaction temperature. The solubilizer, if used, is removed by distillation during the polycondensation. In the copolymerization, any monomer not miscible with the other(s) may be condensed with the counterpart acid(s) or alcohol(s) before the polycondensation.

As well as native ones, modified forms are also examples of amorphous polyester resins. A modified amorphous polyester resin is one that has a non-ester linking group or a non-polyester resin component bound by covalent, ionic, or any other form of bonding. An example is a terminally modified one obtained by reacting a terminally functionalized amorphous polyester resin, for example functionalized with an isocyanate group, with an active hydrogen compound.

The amorphous polyester resin may be a homopolyester resin, or, alternatively, it may be an amorphous resin having an amorphous polyester resin segment and a styrene-acrylic resin segment (hereinafter also referred to as "a hybrid amorphous resin").

A hybrid amorphous resin is a resin in which an amorphous polyester resin segment and a styrene-acrylic resin segment are chemically bound together. The styrene-acrylic resin segment is composed of at least one styrene monomer and at least one (meth)acrylic monomer.

Examples of hybrid amorphous resins include those having a polyester backbone and styrene-acrylic side chains chemically bound to the backbone; those having a styrene-acrylic backbone and polyester side chains chemically bound to the backbone; those having a backbone formed by polyester and styrene-acrylic resins chemically bound together; and those having a backbone formed by polyester and styrene-acrylic resins chemically bound together and polyester and/or styrene-acrylic side chains chemically bound to the backbone.

Examples of styrene monomers include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. One styrene monomer may be used alone, or two or more may be used in combination.

Examples of (meth)acrylic monomers include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. One (meth)acrylic monomer may be used alone, or two or more may be used in combination.

The combined percentage of the polyester resin and styrene-acrylic resin segments to the hybrid amorphous resin as a whole may be 80% by mass or more, preferably 90% by mass or more, more preferably 95% by mass or more, even more preferably 100% by mass.

In the hybrid amorphous resin, furthermore, the percentage of the styrene-acrylic resin segment to the polyester and styrene-acrylic resin segments combined may be 20% by mass or more and 60% by mass or less, preferably 25% by mass or more and 55% by mass or less, more preferably 30% by mass or more and 50% by mass or less.

The production of the hybrid amorphous resin, if produced, may be by one of the following (i) to (iii).

(i) The polyester resin segment is produced by polycondensation between polyhydric alcohol(s) and polycarboxylic acid(s). Then the monomers that will form the styrene-acrylic resin segment are polymerized by addition polymerization.

(ii) The styrene-acrylic resin segment is produced by addition polymerization of monomers capable of it. Then polyhydric alcohol(s) and polycarboxylic acid(s) are polycondensed.

(iii) Polyhydric alcohol(s) and polycarboxylic acid(s) are polycondensed, and monomers capable of addition polymerization are polymerized by addition polymerization at the same time.

The amorphous polyester resin may have the following characteristics.

The glass transition temperature (Tg) of the amorphous resin may be 50° C. or above and 80° C. or below, preferably 50° C. or above and 65° C. or below.

The glass transition temperature can be determined from the DSC curve, measured by differential scanning calorimetry (DSC), and more specifically is the "extrapolated initial temperature of glass transition" as in the methods for determining glass transition temperatures set forth in JIS K7121-1987 "Testing Methods for Transition Temperatures of Plastics."

The weight-average molecular weight (Mw) of the amorphous polyester resin may be 5000 or more and 1000000 or less, preferably 7000 or more and 500000 or less.

The number-average molecular weight (Mn) of the amorphous resin may be 2000 or more and 100000 or less.

The molecular weight distribution, Mw/Mn, of the amorphous resin may be 1.5 or more and 100 or less, preferably 2 or more and 60 or less.

The weight- and number-average molecular weights can be measured by gel permeation chromatography (GPC), using Tosoh's HLC-8120 GPC chromatograph with Tosoh's TSKgel SuperHM-M column (15 cm) in THF as the eluate. Comparing the measured data with a molecular-weight calibration curve prepared using monodisperse polystyrene standards gives the weight- and number-average molecular weights.

The crystalline polyester resin may be as described below.

An example of a crystalline polyester resin is a polycondensate of polycarboxylic acid(s) and polyhydric alcohol(s). Either commercially available or synthesized crystalline polyester resins may be used.

Crystalline polyester resins made with linear aliphatic polymerizable monomers form a crystal structure more easily than those made with aromatic polymerizable monomers.

Examples of polycarboxylic acids include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids, such as phthalic acid, isophthalic acid, terephthalic acid, and naphthalene-2,6-dicarboxylic acid), and anhydrides and lower-alkyl (e.g., C1 to C5 alkyl) esters thereof.

A combination of a dicarboxylic acid and a crosslinked or branched carboxylic acid having three or more carboxylic groups may also be used. Examples of carboxylic acids having three or more carboxylic groups include aromatic carboxylic acids (e.g., 1,2,3-benzenetricarboxylic acid, 1,2,4-benzenetricarboxylic acid, and 1,2,4-naphthalenetricarboxylic acid) and anhydrides and lower-alkyl (e.g., C1 to C5 alkyl) esters thereof.

A combination of an aforementioned dicarboxylic acid and a dicarboxylic acid having a sulfonic acid group or an ethylenic double bond may also be used.

One polycarboxylic acid may be used alone, or two or more may be used in combination.

Examples of polyhydric alcohols include aliphatic diols (e.g., C7 to C20 linear aliphatic diols). Examples of aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Of these, 1,8-octanediol, 1,9-nonanediol, and 1,10-decanediol are preferred.

A combination of a diol and a crosslinked or branched alcohol having three or more hydroxyl groups may also be used. Examples of alcohols having three or more hydroxyl groups include glycerol, trimethylolethane, trimethylolpropane, and pentaerythritol.

One polyhydric alcohol may be used alone, or two or more may be used in combination.

The polyhydric alcohol(s) may include 80 mol % or more aliphatic diol(s), preferably 90 mol % or more aliphatic diol(s).

The production of the crystalline polyester resin, if produced, can be by, for example, known methods, like that of the amorphous polyester resin.

The crystalline polyester resin may be a polymer of linear aliphatic α,ω-dicarboxylic acid(s) and linear aliphatic α,ω-diol(s).

The linear aliphatic α,ω-dicarboxylic acid(s) may be one(s) having a C3 to C14 alkylene group between the two carboxy groups. Preferably, the number of carbon atoms in the alkylene group is 4 or more and 12 or less, more preferably 6 or more and 10 or less.

Examples of linear aliphatic α,ω-dicarboxylic acids include succinic acid, glutaric acid, adipic acid, 1,6-hexanedicarboxylic acid (commonly known as suberic acid), 1,7-heptanedicarboxylic acid (commonly known as azelaic acid), 1,8-octanedicarboxylic acid (commonly known as sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Of these, 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferred.

One linear aliphatic α,ω-dicarboxylic acid may be used alone, or two or more may be used in combination.

The linear aliphatic α,ω-diol(s) may be one(s) having a C3 to C14 alkylene group between the two hydroxy groups. Preferably, the number of carbon atoms in the alkylene group is 4 or more and 12 or less, more preferably 6 or more and 10 or less.

Examples of linear aliphatic α,ω-diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Of these, 1,6-hexanediol, 1,7-heptanediol, 1,8-octanediol, 1,9-nonanediol, and 1,10-decanediol are preferred.

One linear aliphatic α,ω-diol may be used alone, or two or more may be used in combination.

The polymer of linear aliphatic α,ω-dicarboxylic acid(s) and linear aliphatic α,ω-diol(s) may be that of at least one selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol, preferably that of 1,10-decanedicarboxylic acid and 1,6-hexanediol.

The melting temperature of the crystalline polyester resin may be 50° C. or above and 100° C. or below, preferably 55° C. or above and 90° C. or below, more preferably 60° C. or above and 85° C. or below.

The melting temperature is the "peak melting temperature" as in the methods for determining melting temperatures set forth in JIS K 7121-1987 "Testing Methods for Transition Temperatures of Plastics" and is determined from the DSC curve, measured by differential scanning calorimetry (DSC).

The weight-average molecular weight (Mw) of the crystalline polyester resin may be 6,000 or more and 35,000 or less.

The binder resin content may be 40% by mass or more and 95% by mass or less, preferably 50% by mass or more and 90% by mass or less, more preferably 60% by mass or more and 85% by mass or less of the toner particles as a whole.

Other binder resins may be used in combination with the amorphous and crystalline polyester resins. The percentage of the extra binder resin(s) may be 10% by mass or less of all binder resins.

Examples of other binder resins include vinyl resins that are homopolymers of monomers such as styrenes (e.g., styrene, para-chlorostyrene, and α-methylstyrene), (meth) acrylates (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (e.g., acrylonitrile and methacrylonitrile), vinyl ethers (e.g., vinyl methyl ether and vinyl isobutyl ether), vinyl ketones (e.g., vinyl methyl ketone, vinyl ethyl ketone, and vinyl isopropenyl ketone), and olefins (e.g., ethylene, propylene, and butadiene) and copolymers of two or more such monomers.

Non-vinyl resins, such as epoxy resins, polyester resins, polyurethane resins, polyamide resins, cellulose resins, polyether resins, and modified rosin, mixtures of any such resin and vinyl resin(s), and graft copolymers obtained by polymerizing a vinyl monomer in the presence of any such non-vinyl resin may also be used.

Coloring Agent(s)

Examples of coloring agents include pigments, such as carbon black, chrome yellow, Hansa yellow, benzidine yellow, threne yellow, quinoline yellow, pigment yellow, permanent orange GTR, pyrazolone orange, Vulcan orange, Watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, Calco oil blue, methylene blue chloride, phthalocyanine blue, pigment blue, phthalocyanine green, and malachite green oxalate; and dyes, such as acridine, xanthene, azo, benzoquinone, azine, anthraquinone, thioindigo, dioxazine, thiazine, azomethine, indigo, phthalocyanine, aniline black, polymethine, triphenylmethane, diphenylmethane, and thiazole dyes.

One coloring agent may be used alone, or two or more may be used in combination.

Surface-treated coloring agents may optionally be used, and a combination of a coloring agent and a dispersant may also be used. It is also possible to use multiple coloring agents in combination.

The coloring agent content may be 1% by mass or more and 30% by mass or less, preferably 3% by mass or more and 15% by mass or less, of the toner particles as a whole.

Release Agent

An ester-based release agent is a release agent having ester bonds. The ester-based release agent can be any of a monoester-, diester-, triester-, or tetraester-based one and can be a known naturally occurring or synthetic ester wax.

An example of an ester-based release agent is an ester compound formed by a higher fatty acid (e.g., a C10 or longer fatty acid) and a monohydric or polyhydric aliphatic alcohol (e.g., a C8 or longer aliphatic alcohol).

Specifically, the ester-based release agent can be, for example, an ester compound formed by a higher fatty acid (e.g., caprylic acid, capric acid, lauric acid, myristic acid, palmitic acid, stearic acid, arachidic acid, behenic acid, or oleic acid) and an alcohol (monohydric alcohol, such as methanol, ethanol, propanol, isopropanol, butanol, capryl alcohol, lauryl alcohol, myristyl alcohol, cetyl alcohol, stearyl alcohol, or oleyl alcohol; or polyhydric alcohol, such as glycerol, ethylene glycol, propylene glycol, sorbitol, or pentaerythritol). Specific examples include carnauba wax, rice wax, candelilla wax, jojoba oil, Japan wax, beeswax, *Ibotaro* wax (wax produced by *Ericerus pela*), lanoline, and montanate waxes.

Other release agents may be used in combination with the ester-based one. The percentage of the extra release agent(s) may be 10% by mass or less of all release agents.

Examples of other release agents include hydrocarbon waxes; natural waxes, such as carnauba wax, rice wax, and candelilla wax; and synthesized or mineral/petroleum waxes, such as montan wax.

StAc-PO Polycondensate

A StAc-PO polycondensate is a resin formed by a styrene-acrylic resin segment and a polyolefin resin segment chemically bound together by polycondensation. A specific example is a polyolefin-grafted styrene-acrylic polymer.

The styrene-acrylic resin unit is a copolymer formed by copolymerizing at least a styrene monomer (monomer having a styrene backbone) and a (meth)acrylic monomer (monomer having a (meth)acrylic group, preferably a (meth) acryloxy group). Examples of styrene-acrylic resins include copolymers of styrene monomer(s) and (meth)acrylate monomer(s).

The acrylic resin moiety of the styrene-acrylic resin unit is a substructure formed by polymerizing an acrylic monomer, methacrylic monomer, or both. The expression "(meth) acrylic" encompasses both "acrylic" and "methacrylic," and the expression "(meth)acrylate" encompasses both an "acrylate" and a "methacrylate."

Examples of styrene monomers include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. One styrene monomer may be used alone, or two or more may be used in combination.

Examples of (meth)acrylic monomers include (meth) acrylic acid, methyl (meth)acrylate, ethyl (meth)acrylate, n-propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. One (meth)acrylic monomer may be used alone, or two or more may be used in combination.

The ratio between the styrene and (meth)acrylic monomers in the polymerization may be between 70:30 and 95:5 (styrene:(meth)acrylic) on a mass basis.

The styrene-acrylic resin unit may have crosslinks. A crosslinked styrene-acrylic resin can be produced by, for example, copolymerizing a styrene monomer, a (meth) acrylic monomer, and a crosslinking monomer. The crosslinking monomer can be of any kind, but an example is a vinyl monomer having two or more functional groups.

The polyolefin resin unit may be a polymer of one olefin or a copolymer of two or more olefins.

Examples of olefins include linear or branched aliphatic olefins and alicyclic olefins.

Examples of aliphatic olefins include α-olefins, such as ethylene, propylene, 1-butene, 1-hexene, 4-methyl-1-pentene, 1-octene, 1-decene, 1-hexadecene, and 1-octadecene.

Examples of alicyclic olefins include cyclopentene, cycloheptene, norbornene, 5-methyl-2-norbornene, tetracyclododecene, and vinylcyclohexane.

Of these, C2 to C12 (preferably C2 to C6) α-olefins are preferred, ethylene and propylene are more preferred, and propylene is particularly preferred.

Waxes, such as microcrystalline, ester, paraffin, and Fischer-Tropsch waxes, may also be used.

The total percentage of the styrene-acrylic resin and polyolefin resin segments to the entire StAc-PO polycondensate may be 80% by mass or more, preferably 90% by mass or more, more preferably 95% by mass or more, even more preferably 100% by mass.

In the StAc-PO polycondensate, furthermore, the percentage of the styrene-acrylic resin segment to the styrene-acrylic resin and polyolefin resin segments combined may be 20% by mass or more and 60% by mass or less, preferably 25% by mass or more and 55% by mass or less, more preferably 30% by mass or more and 50% by mass or less.

Other Additives

Examples of other additives include known additives, such as magnetic substances, charge control agents, and inorganic powders. Such additives are contained in the toner particles as internal additives.

Characteristics of the Toner Particles

The toner particles may be single-layer ones or may be "core-shell" ones, i.e., toner particles formed by a core (core particle) and a coating that covers the core (shell layer).

Core-shell toner particles may be formed by, for example, a core that contains the binder resins and additives, such as coloring agent(s) and the release agent(s), and a coating that contains the binder resins.

The volume-average diameter (D50v) of the toner particles may be 2 μm or more and 10 μm or less, preferably 4 μm or more and 8 μm or less.

Average diameters and geometric standard deviations of the toner particles can be measured using Coulter Multisizer II (Beckman Coulter) and ISOTON-II electrolyte (Beckman Coulter).

The measurement starts with adding a sample weighing 0.5 mg or more and 50 mg or less to 2 ml of a 5% by mass aqueous solution of a surfactant (e.g., a sodium alkylbenzene sulfonate), which will serve as a dispersant. The resulting dispersion is added to 100 ml or more and 150 ml or less of the electrolyte.

The electrolyte with the suspended sample therein is sonicated for 1 minute using a sonicator, and the size distribution of particles having a diameter of 2 μm or more and 60 μm or less is measured using Coulter Multisizer II with an aperture size of 100 μm. The number of particles sampled is 50000.

On particle size segments (channels) divided based on the measured size distribution, the cumulative distribution of volume and that of frequency are plotted starting from the smallest diameter. In the plots, the particle diameters at which the cumulative sum is 16% are defined as volume diameter D16v and number diameter D16p. The particle diameters at which the cumulative sum is 50% are defined as the volume-average diameter D50v and cumulative number-average diameter D50p, and the particle diameters at which the cumulative sum is 84% are defined as volume diameter D84v and number diameter D84p.

Using these, the geometric standard deviation by volume (GSDv) is given by $(D84v/D16v)^{1/2}$, and that by number (GSDp) is given by $(D84p/D16p)^{1/2}$.

The average circularity of the toner particles may be 0.94 or more and 1.00 or less, preferably 0.95 or more and 0.98 or less.

The average circularity of the toner particles is given by (circumference of the equivalent circle)/(circumference) [(circumference of circles having the same projected area as particle images)/(circumference of projected images of the particles)]. Specifically, the average circularity of the toner particles is the value measured as follows.

A portion of the toner particles of interest is collected by aspiration in such a manner that it will form a flat stream, and this flat stream is photographed with a flash to capture the figures of the particles in a still image. The images of particles are analyzed using a flow particle-image analyzer (Sysmex FPIA-3000), and the average circularity is determined from the results. The number of particles sampled in the determination of the average circularity is 3500.

If the toner contains external additives, the external additives are removed beforehand by dispersing the toner (developer) of interest in water containing a surfactant and then sonicating the resulting dispersion.

External Additives

An example of an external additive is inorganic particles. Examples of inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surface of the externally added inorganic particles may have been rendered hydrophobic. The hydrophobic treatment is done by, for example, immersing the inorganic particles in a hydrophobizing agent. The hydrophobizing agent can be of any kind, but examples include silane coupling agents, silicone oil, titanate coupling agents, and aluminum coupling agents. One such agent may be used alone, or two or more may be used in combination. The amount of the hydrophobizing agent is usually, for example, 1 part by mass or more and 10 parts by mass or less per 100 parts by mass of the inorganic particles.

Materials like resin particles (particles of polystyrene, polymethyl methacrylate, melamine resins, etc.) and active cleaning agents (e.g., metal salts of higher fatty acids, typically zinc stearate, and particles of fluoropolymers) are also examples of external additives.

The amount of the external additive(s) may be 0.01% by mass or more and 5% by mass or less, preferably 0.01% by mass or more and 2.0% by mass or less, of the toner particles.

Production of the Toner

The toner according to this exemplary embodiment can be obtained by producing the toner particles and then adding external additives to the toner particles.

The production of the toner particles can be either by a dry process (e.g., kneading and milling) or by a wet process (e.g., aggregation and coalescence, suspension polymerization, or dissolution and suspension). Any known dry or wet process may be used.

For example, if kneading and milling is used, the toner particles may be produced by kneading the toner materials together and then milling the resulting mixture.

In kneading and milling, the toner materials may be dry-kneaded, or a water-based liquid dispersion of the toner materials prepared beforehand may be dried into a powder, for example using a freeze dryer, and this powder may be melted and kneaded.

If aggregation and coalescence, for example, is used, the production of the toner particles may include:

preparing a liquid dispersion in which particles as a precursor to the binder resins are dispersed, or a liquid dispersion of resin particles (preparation of a liquid dispersion of resin particles); forming aggregates by causing the resin particles (and optionally other particles) to aggregate together in the liquid dispersion of resin particles (or in a mixture with the liquid dispersion(s) of other particles) (formation of aggregates); and forming toner particles by heating the resulting liquid dispersion of aggregates and thereby making the aggregates fuse and coalesce together (fusion and coalescence).

To ensure that the net intensity of each element in the toner particles will be in the range specified above, the production of the toner particles involves adding sources of the elements.

The following describes this process in detail.

It should be noted that the toner particles produced in the process described below contain a coloring agent and a release agent, but the use of a coloring agent is optional. Naturally, other additives may also be used.

Preparation of a Liquid Dispersion of Resin Particles

First, a liquid dispersion in which particles as a precursor to the binder resins are dispersed, or a liquid dispersion of resin particles, is prepared. A liquid dispersion in which particles of the coloring agent are dispersed, or a liquid dispersion of coloring agent particles, and a liquid dispersion in which particles of the release agent are dispersed, or a liquid dispersion of release agent particles, for example, are also prepared at the same time.

The liquid dispersion of resin particles is prepared by, for example, dispersing the resin particles in a dispersion medium using a surfactant.

An example of a dispersion medium used in preparing the liquid dispersion of resin particles is an aqueous medium.

Examples of aqueous media include types of water, such as distilled water and deionized water, and alcohols. One such dispersion medium may be used alone, or two or more may be used in combination.

Examples of surfactants include anionic surfactants, such as sulfates, sulfonates, phosphates, and soap surfactants; cationic surfactants, such as amine salts and quaternary ammonium salts; and nonionic surfactants, such as polyethylene glycol surfactants, ethylene oxide adducts of alkylphenols, and polyhydric alcohols. In particular, anionic surfactants and cationic surfactants are typical examples. Nonionic surfactants may be used in combination with anionic or cationic surfactants.

One surfactant may be used alone, or two or more may be used in combination.

In preparing the liquid dispersion of resin particles, the dispersion of the resin particles in the dispersion medium can be achieved by common techniques, such as a rotary-shear homogenizer, a ball mill, sand mill, Dyno-Mill, and other medium mills. For certain types of resin particles, phase inversion emulsification, for example, may work.

In phase inversion emulsification, the resin to be dispersed is dissolved in a hydrophobic organic solvent good for it first. The resulting organic continuous phase (0 phase) is neutralized with a base, and then an aqueous medium (W phase) is added. This converts the resin emulsion from the W/O to O/W form (so-called phase inversion) and creates a discontinuous phase of the resin, thereby dispersing particles of the resin in the aqueous medium.

The volume-average diameter of the resin particles to be dispersed in the liquid dispersion may be, for example, 0.01 μm or more and 1 μm or less, preferably 0.08 μm or more and 0.8 μm or less, more preferably 0.1 μm or more and 0.6 μm or less.

The volume-average diameter of the resin particles is measured using a size distribution obtained with a laser-diffraction particle size distribution analyzer (e.g., HORIBA LA-700). The measured distribution is divided into segments by particle size (channels), and the cumulative distribution of volume is plotted starting from the smallest diameter. The particle diameter at which the cumulative volume is 50% of the total volume of the particles is the volume-average diameter D50v of the particles. The volume-average diameter of particles in the other liquid dispersions is also measured in the same way.

The amount of the resin particles in the liquid dispersion may be, for example, 5% by mass or more and 50% by mass or less, preferably 10% by mass or more and 40% by mass or less.

The preparation of the liquid dispersion of coloring agent particles and that of release agent particles, for example, is the same as that of the liquid dispersion of resin particles. That is, what is described about the volume-average diameter of particles, dispersion medium, how to disperse the particles, and the amount of particles in relation to the liquid dispersion of resin particles also applies to the particles of the coloring agent and the particles of the release agent in their respective liquid dispersions.

Formation of Aggregates

Then the liquid dispersion of resin particles is mixed with that of coloring agent particles and that of release agent particles.

In the resulting mixture of liquid dispersions, the particles of the resins, coloring agent, and release agent are allowed to undergo heteroaggregation, forming aggregates, including particles of the resins, coloring agent, and release agent, having a diameter close to the planned diameter of the toner particles.

Specifically, for example, a flocculant is added to the mixture of liquid dispersions, and the pH of the mixture is adjusted to an acidic level (e.g., 2 or more and 5 or less). A dispersion stabilizer may optionally be added. The mixture is then heated to a temperature near the glass transition temperature of the resin particles (specifically, for example, a temperature higher than or equal to the glass transition temperature of the resin particles minus 30° C. but not higher than the glass transition temperature of the resin particles minus 10° C.), making the particles dispersed in the mixture flocculate into aggregates.

In the formation of aggregates, the addition of the flocculant may be done, for example, at room temperature (e.g., 25° C.) with the mixture of liquid dispersions stirred using a rotary-shear homogenizer. Then the pH of the mixture is adjusted to an acidic level (e.g., 2 or more and 5 or less), then a dispersion stabilizer is added optionally, and the mixture is heated as described above.

Examples of flocculants include surfactants that have the opposite polarity to the surfactant used as a dispersant in the mixture of liquid dispersions, inorganic metal salts, and divalent or higher-valency metal complexes. Using a metal complex as a flocculant may help improve charging characteristics as it will reduce the surfactant content.

Optionally, an additive that forms a complex or otherwise bind with metal ions from the flocculant may be used. An example is a chelating agent.

Examples of inorganic metal salts include metal salts such as calcium chloride, calcium nitrate, barium chloride, magnesium chloride, zinc chloride, aluminum chloride, and aluminum sulfate and polymers of inorganic metal salts, such as polyaluminum chloride, polyaluminum hydroxide, and calcium polysulfide.

The chelating agent, if used, may be a water-soluble one. Examples of chelating agents include oxycarboxylic acids, such as tartaric acid, citric acid, and gluconic acid, iminodiacetic acid (IDA), nitrilotriacetic acid (NTA), and ethylenediaminetetraacetic acid (EDTA).

The amount of the chelating agent may be, for example, 0.01 parts by mass or more and 5.0 parts by mass or less, preferably 0.1 parts by mass or more and less than 3.0 parts by mass, per 100 parts by mass of the resin particles.

Fusion and Coalescence

The resulting liquid dispersion in which aggregates are dispersed, or liquid dispersion of aggregates, is then heated, for example to a temperature equal to or higher than the glass transition temperature of the resin particles (e.g., to at least 10° C. to 30° C. higher than the glass transition temperature of the resin particles), making the aggregates fuse and coalesce together into toner particles.

This will give the toner particles.

Alternatively, the production of the toner particles may include forming second aggregates and forming core-shell toner particles after the preparation of the liquid dispersion of aggregates. In the formation of second aggregates, the liquid dispersion of aggregates is mixed with an extra volume of the liquid dispersion of resin particles, and the resin particles are allowed to aggregate in such a manner that they will adhere to the surface of the aggregates. The resulting liquid dispersion in which second aggregates are dispersed, or liquid dispersion of second aggregates, is then heated to make the second aggregates fuse and coalesce together into core-shell toner particles.

After the end of fusion and coalescence, the toner particles, formed in a solution, are washed, separated from the solution, and dried by known methods to give dry toner particles.

The washing may be done by sufficient replacement of the solvent with deionized water for chargeability reasons. The separation from the solution can be by any method, but suction filtration, pressure filtration, etc., may be used for productivity reasons. The drying, too, can be by any method, but lyophilization, flash drying, fluidized drying, vibrating fluidized drying, etc., may be used for productivity reasons.

Then adding external additives to the dry toner particles and mixing them together, for example, will give toner according to this exemplary embodiment. The mixing may be done using, for example, a V-blender, Henschel mixer, or Lödige mixer. Optionally, coarse particles may be removed from the toner, for example using a vibrating sieve or air-jet sieve.

Electrostatic Charge Image Developer

An electrostatic charge image developer according to an exemplary embodiment contains at least toner according to the above exemplary embodiment.

The electrostatic charge image developer according to this exemplary embodiment may be a one-component developer, which is substantially toner according to the above exemplary embodiment, or may be a two-component developer, which is a mixture of the toner and a carrier.

The carrier can be of any kind and can be a known one. Examples include a coated carrier, formed by a core magnetic powder and a coating resin on its surface; a magnetic powder-dispersed carrier, formed by a matrix resin and a magnetic powder dispersed therein; and a resin-impregnated carrier, which is a porous magnetic powder impregnated with resin.

The particles as a component of a magnetic powder-dispersed or resin-impregnated carrier can serve as the core material; a carrier obtained by coating the surface of them with resin may also be used.

Examples of magnetic powders include those of magnetic metals, such as iron, nickel, and cobalt, and those of magnetic oxides, such as ferrite and magnetite.

Examples of resins, for use as a coating or matrix, include polyethylene, polypropylene, polystyrene, polyvinyl acetate, polyvinyl alcohol, polyvinyl butyral, polyvinyl chloride, polyvinyl ether, polyvinyl ketone, vinyl chloride-vinyl acetate copolymers, styrene-acrylate copolymers, straight silicone resins, which contain organosiloxane bonds, and their modified forms, fluoropolymers, polyester, polycarbonate, phenolic resins, and epoxy resins.

The coating or matrix resin may contain additives, such as electrically conductive particles.

Examples of electrically conductive particles include particles of metal, such as gold, silver, or copper, and particles of carbon black, titanium oxide, zinc oxide, tin oxide, barium sulfate, aluminum borate, potassium titanate, etc.

When coating the surface of the core material with resin, an exemplary way is to coat the surface with a solution in which the coating resin is dissolved in any kind of solvent optionally with additives, or a coating-layer solution. The solvent can be of any kind and can be selected considering, for example, the coating resin used and suitability for coating.

Specific examples of how to provide the resin coating include dipping, i.e., immersing the core material in the coating-layer solution; spraying, i.e., applying a mist of the coating-layer solution onto the surface of the core material; fluidized bed coating, i.e., applying a mist of the coating-layer solution to core material floated on a stream of air; and kneader-coater coating, i.e., mixing the carrier core material and the coating-layer solution in a kneader-coater and removing the solvent.

For a two-component developer, the mix ratio (by mass) between the toner and the carrier may be between 1:100 (toner:carrier) and 30:100. Preferably, the mix ratio is between 3:100 and 20:100.

Image Forming Apparatus/Image Forming Method

The following describes an image forming apparatus/image forming method according to an exemplary embodiment.

An image forming apparatus according to this exemplary embodiment includes an image carrier; a charging component that charges the surface of the image carrier; an electrostatic charge image creating component that creates an electrostatic charge image on the charged surface of the image carrier; a developing component that contains an electrostatic charge image developer and develops, using the electrostatic charge image developer, the electrostatic charge image on the surface of the image carrier to form a toner image; a transfer component that transfers the toner image on the surface of the image carrier to the surface of a recording medium; and a fixing component that fixes the toner image on the surface of the recording medium. The electrostatic charge image developer is an electrostatic charge developer according to the above exemplary embodiment.

The image forming apparatus according to this exemplary embodiment performs an image forming method that includes charging the surface of an image carrier; creating an electrostatic charge image on the charged surface of the image carrier; developing, using an electrostatic charge image developer according to the above exemplary embodiment, the electrostatic charge image on the surface of the image carrier to form a toner image; transferring the toner image on the surface of the image carrier to the surface of a recording medium; and fixing the toner image on the surface of the recording medium (image forming method according to this exemplary embodiment).

The configuration of the image forming apparatus according to this exemplary embodiment can be applied to well-known types of image forming apparatuses, including a direct-transfer image forming apparatus, which forms a toner image on the surface of an image carrier and transfers it directly to a recording medium; an intermediate-transfer image forming apparatus, which forms a toner image on the surface of an image carrier, transfers it to the surface of an intermediate transfer body (first transfer), and then transfers the toner image on the surface of the intermediate transfer body to the surface of a recording medium (second transfer); an image forming apparatus having a cleaning component that cleans the surface of the image carrier between the transfer of the toner image and charging; and an image forming apparatus having a static eliminator that removes static electricity from the surface of the image carrier by irradiating the surface with antistatic light between the transfer of the toner image and charging.

The transfer component of an intermediate-transfer apparatus may include, for example, an intermediate transfer body, the surface of which is for a toner image to be transferred to; a first transfer component, which transfers the toner image formed on the image carrier to the surface of the intermediate transfer body (first transfer); and a second transfer component, which transfers the toner image on the surface of the intermediate transfer body to the surface of a recording medium (second transfer).

Part of the image forming apparatus according to this exemplary embodiment, e.g., a portion including the developing component, may have a cartridge structure, i.e., a structure that allows the part to be detached from and attached to the image forming apparatus (or may be a process cartridge). An example of a process cartridge is one that includes a developing component that contains an electrostatic charge image developer according to the above exemplary embodiment.

The following describes an example of an image forming apparatus according to this exemplary embodiment, although this is not the only possible form. Some of its structural elements are described with reference to a drawing.

FIG. 1 is a schematic view of the structure of an image forming apparatus according to this exemplary embodiment.

The image forming apparatus illustrated in FIG. 1 includes first to fourth electrophotographic image forming units 10Y, 10M, 10C, and 10K (image forming component) that produce images in the colors of yellow (Y), magenta (M), cyan (C), and black (K), respectively, based on color-separated image data. These image forming units (hereinafter also referred to simply as "units") 10Y, 10M, 10C, and 10K are arranged in a horizontal row with a predetermined distance therebetween. The units 10Y, 10M, 10C, and 10K may be process cartridges, i.e., units that can be detached from and attached to the image forming apparatus.

Above the units 10Y, 10M, 10C, and 10K in the drawing extends an intermediate transfer belt 20 as an intermediate transfer body, passing through each unit. The intermediate transfer belt 20 is wound over a drive roller 22 (right in the drawing) and a support roller 24 (left in the drawing) spaced apart from each other, with the rollers touching the inner surface of the intermediate transfer belt 20, and is driven by them to run in the direction from the first unit 10Y to the fourth unit 10K. The support roller 24 is forced by a spring or similar mechanism, not illustrated in the drawing, to go away from the drive roller 22, thereby placing tension on the intermediate transfer belt 20 wound over the two rollers. On the image-carrying side of the intermediate transfer belt 20 is a cleaning device 30 for the intermediate transfer belt 20, facing the drive roller 22.

The units 10Y, 10M, 10C, and 10K have developing devices (developing component) 4Y, 4M, 4C, and 4K, to which toners in the four colors of yellow, magenta, cyan, and black, respectively, are delivered from toner cartridges 8Y, 8M, 8C, and 8K.

Because the first to fourth units 10Y, 10M, 10C, and 10K are equivalent in structure, the following describes the first one 10Y, located upstream of the others in the direction of running of the intermediate transfer belt 20 and forms a yellow image, on behalf of the four. The second to fourth units 10M, 10C, and 10K are not described; they have structural elements equivalent to those of the first unit 10Y, and these elements are designated with the same numerals as in the first unit 10Y but with the letters M (for magenta), C (for cyan), and K (for black), respectively, in place of Y (for yellow).

The first unit 10Y has a photoreceptor 1Y that acts as an image carrier. Around the photoreceptor 1Y are a charging roller (example of a charging component) 2Y that charges the surface of the photoreceptor 1Y to a predetermined potential; an exposure device (example of an electrostatic charge image creating component) 3 that irradiates the charged surface with a laser beam 3Y produced on the basis of a color-separated image signal to create an electrostatic charge image there; a developing device (example of a developing component) 4Y that supplies charged toner to the electrostatic charge image to develop the electrostatic charge image; a first transfer roller (example of a first transfer component) 5Y that transfers the developed toner image to the intermediate transfer belt 20; and a photoreceptor cleaning device (example of a cleaning component) 6Y that removes residual toner off the surface of the photoreceptor 1Y after the first transfer, arranged in this order.

The first transfer roller 5Y is inside the intermediate transfer belt 20 and faces the photoreceptor 1Y. Each of the first transfer rollers 5Y, 5M, 5C, and 5K is connected to a bias power supply (not illustrated) that applies a first transfer bias to the roller. Each bias power supply is controlled by a controller, not illustrated in the drawing, to change the magnitude of the transfer bias it applies to the corresponding first transfer roller.

The formation of a yellow image at the first unit 10Y may be as described below.

First, before the image formation, the charging roller 2Y charges the surface of the photoreceptor 1Y to a potential of −600 V to −800 V.

The photoreceptor 1Y is a stack of an electrically conductive substrate (e.g., having a volume resistivity at 20° C. of $1\times10^{-6}$ Ω·cm or less) and a photosensitive layer thereon. The photosensitive layer is of high electrical resistance (has the typical resistance of resin) in its normal state, but when it is irradiated with a laser beam 3Y, the resistivity of the irradiated portion changes. Thus, a laser beam 3Y is emitted using the exposure device 3 onto the charged surface of the photoreceptor 1Y in accordance with data for the yellow image sent from a controller, not illustrated in the drawing. The laser beam 3Y hits the photosensitive layer on the surface of the photoreceptor 1Y, creating an electrostatic charge image as a pattern for the yellow image on the surface of the photoreceptor 1Y.

The electrostatic charge image is an image created on the surface of the photoreceptor 1Y by electrical charging and is a so-called negative latent image; it is created as a result of the charge on the surface of the photoreceptor 1Y flowing away in the irradiated portion of the photosensitive layer in response to a resistivity decrease caused by the exposure to the laser beam 3Y while staying in the portion of the photosensitive layer not irradiated with the laser beam 3Y.

The electrostatic charge image created on the photoreceptor 1Y is moved to a predetermined development point as the photoreceptor 1Y rotates. At this development point, the electrostatic charge image on the photoreceptor 1Y is visualized (developed) into a toner image by the developing device 4Y.

Inside the developing device 4Y is an electrostatic charge image developer that contains, for example, at least yellow toner and a carrier. The yellow toner is on a developer roller (example of a developer carrier) and has been triboelectrically charged with the same polarity as the charge on the photoreceptor 1Y (negative) as a result of being stirred inside the developing device 4Y. As the surface of the photoreceptor 1Y passes through the developing device 4Y, the yellow toner electrostatically adheres to the uncharged, latent-image area of the surface of the photoreceptor 1Y and develops the latent image. The photoreceptor 1Y, now having a yellow toner image thereon, then continues rotating at a predetermined speed, transporting the toner image developed thereon to a predetermined first transfer point.

After the arrival of the yellow toner image on the photoreceptor 1Y at the first transfer point, a first transfer bias is applied to the first transfer roller 5Y, and an electrostatic force acts on the toner image in the direction from the photoreceptor 1Y toward the first transfer roller 5Y to cause the toner image to be transferred from the photoreceptor 1Y to the intermediate transfer belt 20. The applied transfer bias has the (+) polarity, opposite the polarity of the toner (−), and its amount has been controlled by a controller (not illustrated). For example, for the first unit 10Y, it has been controlled to +10 μA.

Residual toner on the photoreceptor 1Y is removed and collected at the photoreceptor cleaning device 6Y.

The first transfer biases applied to the first transfer rollers 5M, 5C, and 5K of the second, third, and fourth units 10M, 10C, and 10K have also been controlled in the same way as that at the first unit 10Y.

The intermediate transfer belt 20 to which a yellow toner image has been transferred at the first unit 10Y in this way is then transported passing through the second to fourth units 10M, 10C, and 10K sequentially, and toner images in the respective colors are overlaid to complete multilayer transfer.

The intermediate transfer belt 20 that has passed through the first to fourth units and thereby completed multilayer transfer of toner images in four colors then reaches a second transfer section formed by the intermediate transfer belt 20, the support roller 24, which touches the inner surface of the intermediate transfer belt 20, and a second transfer roller (example of a second transfer component) 26, which is on the image-carrying side of the intermediate transfer belt 20. Recording paper (example of a recording medium) P is fed to the point of contact between the second transfer roller 26 and the intermediate transfer belt 20 in a timed manner by a feeding mechanism, and a second transfer bias is applied to the support roller 24. The applied transfer bias has the (−) polarity, the same as the polarity of the toner (−), and an electrostatic force acts on the toner image in the direction from the intermediate transfer belt 20 toward the recording paper P to cause the toner image to be transferred from the intermediate transfer belt 20 to the recording paper P. The amount of the second transfer bias has been controlled and is determined in accordance with the resistance detected by a resistance detector (not illustrated) that detects the electrical resistance of the second transfer section.

After that, the recording paper P is sent to the point of pressure contact (nip) between a pair of fixing rollers at a fixing device (example of a fixing component) 28, and the toner image is fixed on the recording paper P there to give a fixed image.

The recording paper P to which the toner image is transferred can be, for example, a piece of ordinary printing paper for copiers, printers, etc., of electrophotographic type. Recording media such as overhead-projector (OHP) sheets may also be used.

The use of recording paper P having a smooth surface may help further improve the smoothness of the surface of the fixed image. For example, coated paper, which is paper with a coating, for example of resin, on its surface, or art paper for printing may be used.

The recording paper P with a completely fixed color image thereon is transported to an ejection section to finish the formation of a color image.

Process Cartridge/Toner Cartridge

The following describes a process cartridge according to an exemplary embodiment.

A process cartridge according to this exemplary embodiment is one attachable to and detachable from an image forming apparatus and includes a developing component that contains an electrostatic charge image developer according to the above exemplary embodiment and develops, using the electrostatic charge image developer, an electrostatic charge image created on the surface of an image carrier to form a toner image.

This is not the only possible configuration of a process cartridge according to this exemplary embodiment. The process cartridge may optionally have at least one extra component selected from an image carrier, a charging component, an electrostatic charge image creating component, a transfer component, etc., besides the developing component.

The following describes an example of a process cartridge according to this exemplary embodiment, although this is not the only possible form. Some of its structural elements are described with reference to a drawing.

Figure 2:
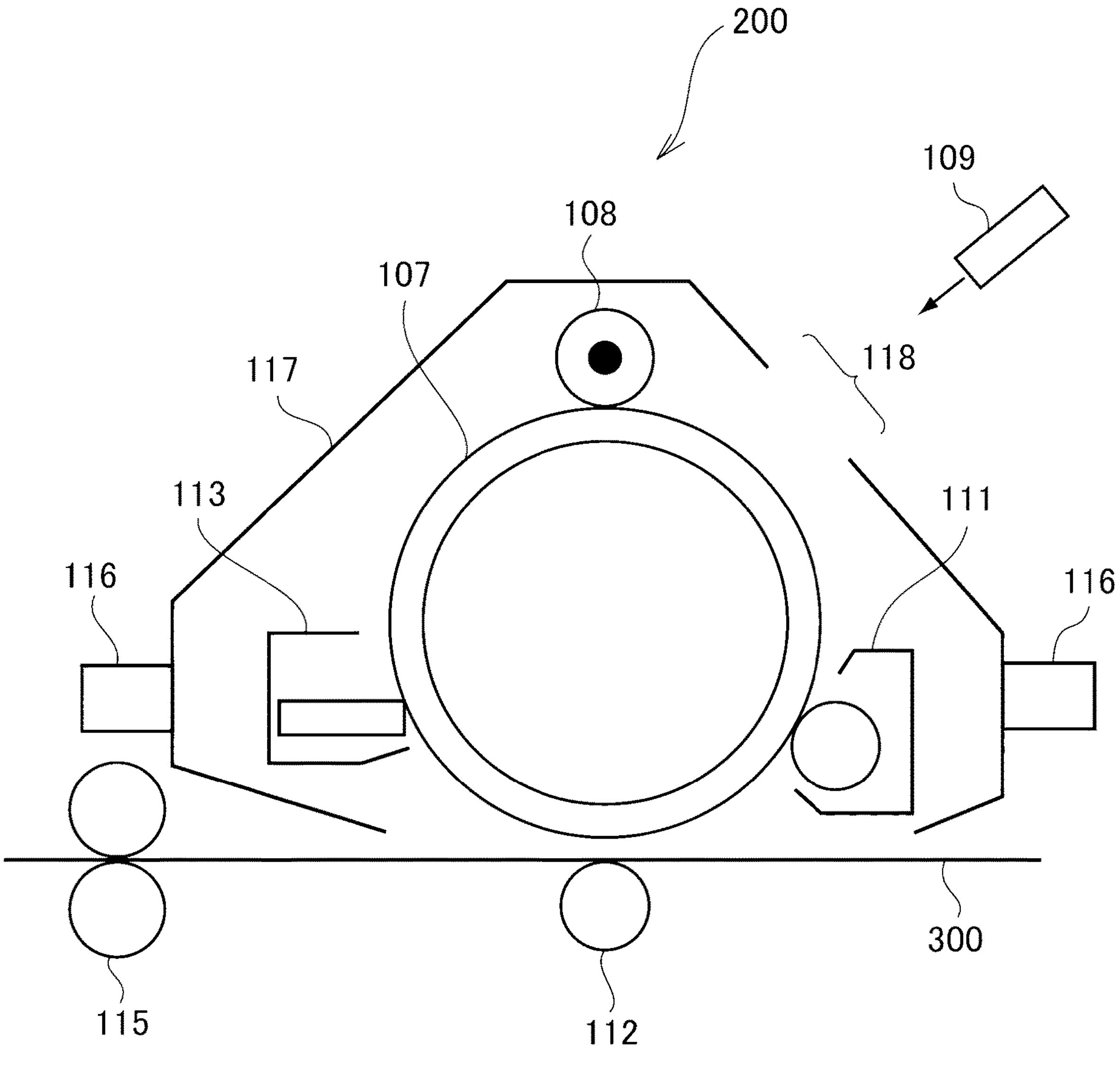
FIG. 2 is a schematic view of the structure of an example of a process cartridge according to an exemplary embodiment attachable to and detachable from an image forming apparatus.

FIG. 2 is a schematic view of the structure of a process cartridge according to this exemplary embodiment.

The process cartridge 200 illustrated in FIG. 2 is a cartridge containing, for example, a photoreceptor 107 (example of an image carrier) and a charging roller 108 (example of a charging component), a developing device 111 (example of a developing component), and a photoreceptor cleaning device 113 (example of a cleaning component)

arranged around the photoreceptor 107, all held together in a housing 117 having attachment rails 116 and an opening 118 for exposure to light.

FIG. 2 also illustrates an exposure device (example of an electrostatic charge image creating component) 109, a transfer device (example of a transfer component) 112, a fixing device (example of a fixing component) 115, and recording paper (example of a recording medium) 300.

The following describes a toner cartridge according to this exemplary embodiment.

A toner cartridge according to this exemplary embodiment is one attachable to and detachable from an image forming apparatus and contains toner according to the above exemplary embodiment. A toner cartridge is a cartridge that stores replenishment toner for a developing component placed inside an image forming apparatus.

The image forming apparatus illustrated in FIG. 1 has toner cartridges 8Y, 8M, 8C, and 8K attachable to and detachable from it, and the developing devices 4Y, 4M, 4C, and 4K are connected to their corresponding toner cartridges (or the toner cartridges for their respective colors) by toner feed tubing, not illustrated in the drawing. When there is little toner in a toner cartridge, this toner cartridge is replaced.

EXAMPLES

The following describes exemplary embodiments of the present disclosure in detail by providing examples, although the exemplary embodiments of the present disclosure are not limited to these examples. In the following description, "parts" and "%" are by mass unless stated otherwise.

Synthesis of Amorphous Polyester Resins

Synthesis of Amorphous Polyester Resin (A1)

Terephthalic acid: 150 parts
Fumaric acid: 325 parts
Trimellitic acid: 25 parts
A 2-mole ethylene oxide adduct of bisphenol A: 350 parts
A 2-mole propylene oxide adduct of bisphenol A: 150 parts These materials are loaded into a reactor equipped with a stirring device, a nitrogen inlet tube, a temperature sensor, and a rectifying column. The temperature is increased to 220° C. over 1 hour, and 1.2 parts of dibutyl tin oxide is added to 100 parts of the materials. The temperature is increased to 240° C. over 6 hours while water is removed by distillation as it is formed. After 3 hours of dehydration condensation at 240° C., the reaction product is cooled, giving amorphous polyester resin (A1). The SP of the amorphous polyester resin is 9.71.

Synthesis of Amorphous Polyester Resin (A2)

Amorphous polyester resin (A2), having an SP of 9.45, is obtained in the same way as amorphous polyester resin (A1) except that the materials are changed to 50 parts of terephthalic acid, 425 parts of fumaric acid, 25 parts of trimellitic acid, 0 parts of a 2-mole ethylene oxide adduct of bisphenol A, and 500 parts of a 2-mole propylene oxide adduct of bisphenol A.

Synthesis of Amorphous Polyester Resin (A3)

Amorphous polyester resin (A3), having an SP of 9.85, is obtained in the same way as amorphous polyester resin (A1) except that the materials are changed to 450 parts of terephthalic acid, 2.5 parts of fumaric acid, 2.5 parts of trimellitic acid, 500 parts of a 2-mole ethylene oxide adduct of bisphenol A, and 0 parts of a 2-mole propylene oxide adduct of bisphenol A.

Production of Crystalline Polyester Resins

Production of Crystalline Polyester Resin (B1)

1,10-Decanedicarboxylic acid: 260 parts
1,6-Hexanediol: 167 parts
Dibutyltin oxide (catalyst): 0.3 parts These materials are put into a three-neck flask dried by heating, and, after the air in the flask is replaced with nitrogen gas to create an inert atmosphere, the materials are stirred under reflux for 5 hours at 180° C. by mechanical stirring. Then the resulting mixture is heated to 230° C. gently and stirred for 4 hours under reduced pressure, and the thickened mixture is air-cooled to terminate the reaction. This will give crystalline polyester resin (B1), having a weight-average molecular weight of 31000, a melting temperature of 73° C., and an SP of 9.02.

Synthesis of Crystalline Polyester Resin (B2)

Crystalline polyester resin (B2), having a weight-average molecular weight of 28900, a melting temperature of 73° C., and an SP of 8.88, is obtained in the same way as crystalline polyester resin (B1) except that the 167 parts of 1,6-hexanediol is changed to 143 parts of 1,9-nonanediol.

Synthesis of StAc-PO Polycondensates

Synthesis of StAc-PO Polycondensate (SP1)

Xylene: 500 parts
Polypropylene: 100 parts

These materials are put into a reactor equipped with a stirrer, a thermometer, a condenser, and a nitrogen gas tube, and the inside of the reactor is purged with dry nitrogen gas for 10 minutes. Then with a nitrogen stream into the reactor and at 190° C., the mixture is heated and stirred until the polypropylene dissolves completely, and the product is checked to ensure the polypropylene has dissolved. This will give a solution of polypropylene.

Styrene: 46 parts
Butyl acrylate: 53 parts
t-butyl cumyl peroxide: 5 parts
Divinylbenzene: 2.5 parts
Xylene: 500 parts To the polypropylene solution, a solution prepared by mixing these materials together is added dropwise over 2 hours under 150° C. conditions. After being left for 2 hours, the resulting mixture is stripped of the solvent and dried under room temperature conditions, giving StAc-PO polycondensate (SP1), having an SP of 8.55.

Synthesis of StAc-PO Polycondensate (SP2)

StAc-PO polycondensate (SP2), having an SP of 8.55, is obtained in the same way as StAc-PO polycondensate (SP1) except that the amounts of styrene and butyl acrylate are changed to 36 parts and 63 parts, respectively. Synthesis of StAc-PO Polycondensates (SP3) to (SP11) and (C1) and (C2)

StAc-PO Polycondensates (SP3) to (SP11) and (C1) and (C2) are obtained in the same way as StAc-PO polycondensate (SP1) except that the formula is changed to that in Table 1.

TABLE 1

| | Monomer | | SP1 | SP2 | SP3 | SP4 | SP5 | SP6 | SP7 | SP8 |
|---|---|---|---|---|---|---|---|---|---|---|
| Formula | Styrene | Parts | 46 | 40 | 51 | 35 | 57 | 48 | 59 | 59 |
| | Butyl acrylate | Parts | 53 | 58 | 46 | 62 | 42 | 55 | 38 | 38 |
| | t-butyl cumyl peroxide | Parts | 5 | 5 | 5 | 5 | 5 | 5 | 5 | 5 |

TABLE 1-continued

| | | | | | | | | | | |
|---|---|---|---|---|---|---|---|---|---|---|
| | Divinylbenzene | Parts | 2.5 | 2.5 | 2.5 | 2.5 | 2.5 | 2.5 | 2.5 | 3.5 |
| | Xylene | Parts | 500 | 500 | 500 | 500 | 500 | 500 | 500 | 500 |
| Characteristics | SP | | 8.55 | 8.57 | 8.53 | 8.61 | 8.51 | 8.56 | 8.49 | 8.48 |

| | Monomer | | SP9 | SP10 | SP11 | SP C1 | SP C2 |
|---|---|---|---|---|---|---|---|
| Formula | Styrene | Parts | 32 | 60 | 39 | 32 | 44 |
| | Butyl acrylate | Parts | 64 | 38 | 57 | 64 | 57 |
| | t-butyl cumyl peroxide | Parts | 5 | 5 | 5 | 5 | 5 |
| | Divinylbenzene | Parts | 2 | 4 | 1 | 0.2 | 0.2 |
| | Xylene | Parts | 500 | 500 | 500 | 500 | 500 |
| Characteristics | SP | | 8.62 | 8.47 | 8.54 | 8.65 | 8.58 |

Example 1

Amorphous polyester resin: 126 parts

Crystalline polyester resin: 22 parts

Coloring agent 1 (carbon black, Mitsubishi Chemical #25): 6 parts

Release agent W1 (ester wax, Nippon Seiro WEP, melting temperature=78° C.): 10 parts StAc-PO polycondensate (SP1): 30 parts These materials are mixed together in a Henschel mixer (FM75L, Nippon Coke & Engineering), then the mixture is kneaded through a twin-screw extruder (TEM-48SS, Shibaura Machine), and the resulting mass is rolled and cooled. The cooled mass is shredded in a hammer mill, the resulting grains are pulverized in a jet mill (AFG, Hosokawa Micron), and the resulting particles are classified using an elbow-jet classifier (EJ-LABO, Nittetsu Mining), giving toner particles 1.

Toner particles 1: 100 parts

Sol-gel silica particles (number-average diameter=120 nm): 2.0 parts

Strontium titanate particles (number-average diameter=50 nm): 0.2 parts

These materials are mixed together in a Henschel mixer, giving toner 1.

Examples 2 to 49 and Comparative Examples 1 to 6

Toners 2 to 49 and C1 to C6 are obtained in the same way as toner 1, except that the parameters are changed to those in Tables 2-1-1, 2-1-2, 2-2-1, 2-2-2, 2-3-1, 2-3-2, 2-4-1, and 2-4-2.

Characteristics and Other Details

Tables 2-1-1 to 2-4-2 present the characteristics listed below of the toner particles, together with characteristics, amount, etc., of their ingredients. In Tables 2-1-1 to 2-4-2, the meanings of the abbreviations are as follows.

Amorphous PE: Amorphous polyester resin

Crystalline PE: Crystalline polyester resin

StAc-PO polycondensate: Polycondensate of styrene-acrylic and polyolefin resins $G'_T$ (70): Storage modulus $G'_T$ (70) at 70° C. of the toner particles $G'_T$ (90): Storage modulus $G'_T$ (90) at 90° C. of the toner particles $G'_{SP}$ (70): Storage modulus $G'_{SP}$ (70) at 70° C. of the StAc-PO polycondensate $G'_{SP}$ (90): Storage modulus $G'_{SP}$ (90) at 90° C. of the StAc-PO polycondensate tan δ Td: Temperature Td at which the loss tangent tan δ of the toner particles peaks Tw: Melting temperature Tw of the release agent Domain diameter: Diameter of domains of the release agent in a cross-sectional observation of the toner particles Percentage area in the surface layer: Percentage area of the release agent in the surface layer of the toner particles in a cross-sectional observation of the toner particles SP1: Solubility parameter SP1 of the styrene-acrylic resin in the StAc-PO polycondensate $SP2_A$: Solubility parameter $SP2_A$ of the amorphous polyester resin $SP2_C$: Solubility parameter $SP2_C$ of the crystalline polyester resin SP2: Average solubility parameter SP2 of the amorphous and crystalline polyester resins SP3: Solubility parameter SP3 of the release agent $C_A$: Amorphous polyester resin content $C_A$ (of the toner particles)

$C_C$: Crystalline polyester resin content $C_C$ (of the toner particles)

$C_{AC}$: Total amorphous and crystalline polyester resins content $C_{AC}$ (of the toner particles)

$C_W$: Release agent content $C_W$ (of the toner particles)

$C_{SP}$: StAc-PO polycondensate content $C_{SP}$ (of the toner particles)

Testing

With the toners of the Examples and Comparative Examples, developers are prepared for the image forming apparatus "ApeosPort-IV C3370 color photocopier" (FUJIFILM Business Innovation Corp.).

Each developer is loaded into the developing element of the image forming apparatus and tested as follows.

Fixation at Low Temperatures

The fixing element is removed from the image forming apparatus, and an unfixed image is produced after customization to make the toner loading 0.45 mg/cm$^2$. The recording medium is FUJIFILM Business Innovation Corp.'s A4-sized OS Coat W paper (grammage, 127 gsm). A 50 mm×50 mm, 100% coverage image is produced.

The system for fixation testing is a modified version of FUJIFILM Business Innovation Corp.'s ApeosPort-IV C3370, with its fixing element dismounted and capable of changing the nip pressure and fixing temperature. The process speed is set to 175 mm/sec. The resulting fixed image is bent using a weight, and the quality of the image is graded by the extent of damage at the bend.

The criteria for grading are as follows.

G1: No damage to the image

G2: The image is damaged, but only to a minor extent

G3: The image is damaged slightly, but to an acceptable extent

G4: Damage is observed on the image

Suitability for Postprocessing

Using the image forming apparatus, a 50 mm×200 mm, 100% coverage image is printed continuously on 100 sheets of FUJIFILM Business Innovation Corp.'s A4-sized OS Coat W paper (grammage, 127 gsm) as a recording medium after customization to make the toner loading 0.45 mg/cm$^2$. The print ejection port has been modified so that paper transport rollers will touch the surface of the fixed image while transporting freshly printed sheets of paper. Suitability for postprocessing is graded by whether the surface condition of the image has changed where it is touched by the rollers.

The criteria for grading are as follows.

A: No visible change in the surface condition of the image.

B: The change in the surface condition of the image is minor.

C: A slight but acceptable change is observed in the surface condition of the image.

D: The change in the surface condition of the image is unacceptably great.

TABLE 2-1-1

| | Binder resins | | | | | | | | | |
|---|---|---|---|---|---|---|---|---|---|---|
| | Amorphous PE | | | | Crystalline PE | | | | | |
| | Type A No. | Parts | $C_A$ % by mass | $SP2_A$ | Type B No. | Parts | $C_c$ % by mass | $SP2_c$ | CAC (CA + CC) % by mass | SP2 |
| Example 1 | 1 | 126 | 63 | 9.71 | 1 | 22 | 11 | 9.02 | 74 | 9.61 |
| Example 2 | 1 | 126 | 63 | 9.71 | 1 | 22 | 11 | 9.02 | 74 | 9.61 |
| Example 3 | 1 | 126 | 63 | 9.71 | 1 | 22 | 11 | 9.02 | 74 | 9.61 |
| Example 4 | 1 | 102 | 51 | 9.71 | 1 | 46 | 23 | 9.02 | 74 | 9.5 |
| Example 5 | 1 | 136 | 68 | 9.71 | 1 | 12 | 6 | 9.02 | 74 | 9.65 |
| Example 6 | 1 | 126 | 63 | 9.71 | 1 | 22 | 11 | 9.02 | 74 | 9.61 |
| Example 7 | 1 | 126 | 63 | 9.71 | 1 | 22 | 11 | 9.02 | 74 | 9.61 |
| Example 8 | 1 | 126 | 63 | 9.71 | 1 | 22 | 11 | 9.02 | 74 | 9.61 |
| Example 9 | 1 | 126 | 63 | 9.71 | 1 | 22 | 11 | 9.02 | 74 | 9.61 |
| Example 10 | 1 | 126 | 63 | 9.71 | 1 | 22 | 11 | 9.02 | 74 | 9.61 |
| Example 11 | 1 | 126 | 63 | 9.71 | 1 | 22 | 11 | 9.02 | 74 | 9.61 |
| Example 12 | 1 | 126 | 63 | 9.71 | 1 | 22 | 11 | 9.02 | 74 | 9.61 |
| Example 13 | 1 | 126 | 63 | 9.71 | 1 | 22 | 11 | 9.02 | 74 | 9.61 |
| Example 14 | 1 | 126 | 63 | 9.71 | 1 | 22 | 11 | 9.02 | 74 | 9.61 |
| Example 15 | 1 | 126 | 63 | 9.71 | 1 | 22 | 11 | 9.02 | 74 | 9.61 |
| Example 16 | 1 | 126 | 63 | 9.71 | 1 | 22 | 11 | 9.02 | 74 | 9.61 |
| Example 17 | 1 | 126 | 63 | 9.71 | 1 | 22 | 11 | 9.02 | 74 | 9.61 |
| Example 18 | 1 | 126 | 63 | 9.71 | 1 | 22 | 11 | 9.02 | 74 | 9.61 |
| Example 19 | 1 | 126 | 63 | 9.71 | 1 | 22 | 11 | 9.02 | 74 | 9.61 |
| Example 20 | 1 | 126 | 63 | 9.71 | 1 | 22 | 11 | 9.02 | 74 | 9.61 |
| Example 21 | 1 | 126 | 63 | 9.71 | 1 | 22 | 11 | 9.02 | 74 | 9.61 |
| Example 22 | 2 | 126 | 63 | 9.71 | 2 | 38 | 19 | 9.02 | 82 | 9.3 |
| Example 23 | 2 | 126 | 63 | 9.71 | 2 | 20 | 10 | 9.02 | 73 | 9.38 |
| Example 24 | 3 | 126 | 63 | 9.71 | 1 | 20 | 10 | 9.02 | 73 | 9.73 |
| Example 25 | 3 | 126 | 63 | 9.71 | 1 | 10 | 5 | 9.02 | 68 | 9.79 |
| Example 26 | 2 | 126 | 63 | 9.71 | 1 | 36 | 18 | 9.02 | 81 | 9.31 |
| Example 27 | 1 | 126 | 63 | 9.71 | 2 | 44 | 22 | 9.02 | 85 | 9.46 |
| Example 28 | 1 | 126 | 63 | 9.71 | 2 | 10 | 5 | 9.02 | 68 | 9.66 |
| Example 29 | 3 | 126 | 63 | 9.71 | 1 | 20 | 10 | 9.02 | 73 | 9.73 |

TABLE 2-1-2

| | Binder resins | | | | | | | | | |
|---|---|---|---|---|---|---|---|---|---|---|
| | Amorphous PE | | | | Crystalline PE | | | | | |
| | Type A No. | Parts | $C_A$ % by mass | $SP2_A$ | Type B No. | Parts | $C_c$ % by mass | $SP2_c$ | CAC (CA + CC) % by mass | SP2 |
| Example 30 | 1 | 126 | 63 | 9.71 | 1 | 22 | 11 | 9.02 | 74 | 9.61 |
| Example 31 | 1 | 126 | 63 | 9.71 | 1 | 22 | 11 | 9.02 | 74 | 9.61 |
| Example 32 | 1 | 126 | 63 | 9.71 | 1 | 22 | 11 | 9.02 | 74 | 9.61 |
| Example 33 | 1 | 126 | 63 | 9.71 | 1 | 22 | 11 | 9.02 | 74 | 9.61 |
| Example 34 | 1 | 126 | 63 | 9.71 | 1 | 22 | 11 | 9.02 | 74 | 9.61 |
| Example 35 | 1 | 126 | 63 | 9.71 | 1 | 22 | 11 | 9.02 | 74 | 9.61 |
| Example 36 | 1 | 126 | 63 | 9.71 | 1 | 22 | 11 | 9.02 | 74 | 9.61 |
| Example 37 | 1 | 126 | 63 | 9.71 | 1 | 22 | 11 | 9.02 | 74 | 9.61 |
| Example 38 | 1 | 80 | 40 | 9.71 | 1 | 14 | 7 | 9.02 | 47 | 9.61 |
| Example 39 | 1 | 86 | 43 | 9.71 | 1 | 16 | 8 | 9.02 | 51 | 9.6 |
| Example 40 | 1 | 150 | 75 | 9.71 | 1 | 26 | 13 | 9.02 | 88 | 9.61 |
| Example 41 | 1 | 154 | 77 | 9.71 | 1 | 28 | 14 | 9.02 | 91 | 9.6 |
| Example 42 | 1 | 126 | 63 | 9.71 | 1 | 6 | 3 | 9.02 | 66 | 9.68 |

TABLE 2-1-2-continued

| | Binder resins | | | | | | | | | |
|---|---|---|---|---|---|---|---|---|---|---|
| | Amorphous PE | | | | Crystalline PE | | | | | |
| | Type A No. | Parts | $C_A$ % by mass | $SP2_A$ | Type B No. | Parts | $C_c$ % by mass | $SP2_c$ | CAC (CA + CC) % by mass | SP2 |
| Example 43 | 1 | 126 | 63 | 9.71 | 1 | 8 | 4 | 9.02 | 67 | 9.67 |
| Example 44 | 1 | 126 | 63 | 9.71 | 1 | 60 | 30 | 9.02 | 93 | 9.49 |
| Example 45 | 1 | 126 | 63 | 9.71 | 1 | 64 | 32 | 9.02 | 95 | 9.48 |
| Example 46 | 1 | 126 | 63 | 9.71 | 1 | 22 | 11 | 9.02 | 74 | 9.61 |
| Example 47 | 1 | 126 | 63 | 9.71 | 1 | 22 | 11 | 9.02 | 74 | 9.61 |
| Example 48 | 1 | 126 | 63 | 9.71 | 1 | 22 | 11 | 9.02 | 74 | 9.61 |
| Example 49 | 1 | 126 | 63 | 9.71 | 1 | 22 | 11 | 9.02 | 74 | 9.61 |
| Comparative Example 1 | 1 | 126 | 63 | 9.71 | 1 | 48 | 24 | 9.02 | 87 | 9.52 |
| Comparative Example 2 | 1 | 126 | 63 | 9.71 | 1 | 4 | 2 | 9.02 | 65 | 9.69 |
| Comparative Example 3 | 1 | 126 | 63 | 9.71 | 1 | 32 | 16 | 9.02 | 79 | 9.57 |
| Comparative Example 4 | 1 | 126 | 63 | 9.71 | 1 | 10 | 5 | 9.02 | 68 | 9.66 |
| Comparative Example 5 | 1 | 126 | 63 | 9.71 | 1 | 8 | 4 | 9.02 | 67 | 9.67 |

TABLE 2-2-1

| | Release agent | | | | | | | StAc-PO polycondensate | | | |
|---|---|---|---|---|---|---|---|---|---|---|---|
| | Type W No. | Parts | Cw % by mass | SP3 | Tw ° C. | Domain diameter nm | Percentage area in the surface layer % area | Type SP No. | Parts | $C_{SP}$ % by mass | SP1 |
| Example 1 | 1 | 10 | 5 | 8.4 | 78 | 578 | 3.2 | 1 | 30 | 15 | 8.55 |
| Example 2 | 1 | 10 | 5 | 8.4 | 78 | 622 | 5.3 | 2 | 30 | 15 | 8.57 |
| Example 3 | 1 | 10 | 5 | 8.4 | 78 | 610 | 4.7 | 3 | 30 | 15 | 8.53 |
| Example 4 | 1 | 10 | 5 | 8.4 | 78 | 594 | 5.6 | 1 | 30 | 15 | 8.55 |
| Example 5 | 1 | 10 | 5 | 8.4 | 78 | 575 | 5 | 1 | 30 | 15 | 8.55 |
| Example 6 | 1 | 10 | 5 | 8.4 | 78 | 628 | 5.6 | 4 | 30 | 15 | 8.61 |
| Example 7 | 1 | 10 | 5 | 8.4 | 78 | 577 | 5.4 | 5 | 30 | 15 | 8.51 |
| Example 8 | 1 | 10 | 5 | 8.4 | 78 | 659 | 5.2 | 6 | 30 | 15 | 8.56 |
| Example 9 | 1 | 10 | 5 | 8.4 | 78 | 592 | 4.2 | 7 | 30 | 15 | 8.49 |
| Example 10 | 1 | 10 | 5 | 8.4 | 78 | 528 | 5.4 | 8 | 30 | 15 | 8.48 |
| Example 11 | 1 | 10 | 5 | 8.4 | 78 | 741 | 4.9 | 9 | 30 | 15 | 8.62 |
| Example 12 | 1 | 10 | 5 | 8.4 | 78 | 671 | 4.5 | 10 | 30 | 15 | 8.47 |
| Example 13 | 1 | 10 | 5 | 8.4 | 78 | 506 | 4.2 | 11 | 30 | 15 | 8.54 |
| Example 14 | 1 | 10 | 5 | 8.4 | 78 | 584 | 5.2 | 1 | 30 | 15 | 8.55 |
| Example 15 | 1 | 10 | 5 | 8.4 | 78 | 742 | 5.1 | 1 | 30 | 15 | 8.55 |
| Example 16 | 1 | 10 | 5 | 8.4 | 78 | 93 | 4.8 | 1 | 30 | 15 | 8.55 |
| Example 17 | 1 | 10 | 5 | 8.4 | 78 | 104 | 4.6 | 1 | 30 | 15 | 8.55 |
| Example 18 | 1 | 10 | 5 | 8.4 | 78 | 795 | 5 | 1 | 30 | 15 | 8.55 |
| Example 19 | 1 | 10 | 5 | 8.4 | 78 | 810 | 5.9 | 1 | 30 | 15 | 8.55 |
| Example 20 | 1 | 10 | 5 | 8.4 | 78 | 607 | 9.2 | 1 | 30 | 15 | 8.55 |
| Example 21 | 1 | 10 | 5 | 8.4 | 78 | 624 | 10.5 | 1 | 30 | 15 | 8.55 |
| Example 22 | 1 | 10 | 5 | 8.4 | 78 | 558 | 4.7 | 1 | 30 | 15 | 8.55 |
| Example 23 | 1 | 10 | 5 | 8.4 | 78 | 597 | 5 | 1 | 30 | 15 | 8.55 |
| Example 24 | 1 | 10 | 5 | 8.4 | 78 | 535 | 5.2 | 1 | 30 | 15 | 8.55 |
| Example 25 | 1 | 10 | 5 | 8.4 | 78 | 636 | 4 | 1 | 30 | 15 | 8.55 |
| Example 26 | 1 | 10 | 5 | 8.4 | 78 | 527 | 5.8 | 1 | 30 | 15 | 8.55 |
| Example 27 | 1 | 10 | 5 | 8.4 | 78 | 481 | 4.7 | 1 | 30 | 15 | 8.55 |
| Example 28 | 1 | 10 | 5 | 8.4 | 78 | 633 | 5.9 | 1 | 30 | 15 | 8.55 |
| Example 29 | 1 | 10 | 5 | 8.4 | 78 | 675 | 4.9 | 1 | 30 | 15 | 8.55 |

TABLE 2-2-2

| | Release agent | | | | | | | StAc-PO polycondensate | | | |
|---|---|---|---|---|---|---|---|---|---|---|---|
| | Type W No. | Parts | Cw % by mass | SP3 | Tw ° C. | Domain diameter nm | Percentage area in the surface layer % area | Type SP No. | Parts | $C_{SP}$ % by mass | SP1 |
| Example 30 | 1 | 10 | 5 | 8.4 | 78 | 593 | 4.9 | 1 | 12 | 6 | 8.55 |
| Example 31 | 1 | 10 | 5 | 8.4 | 78 | 586 | 5.6 | 1 | 15 | 7.5 | 8.55 |
| Example 32 | 1 | 10 | 5 | 8.4 | 78 | 517 | 4.4 | 1 | 50 | 25 | 8.55 |
| Example 33 | 1 | 10 | 5 | 8.4 | 78 | 636 | 4.9 | 1 | 56 | 28 | 8.55 |
| Example 34 | 1 | 10 | 5 | 8.4 | 78 | 606 | 5.1 | 1 | 18 | 9 | 8.55 |
| Example 35 | 1 | 10 | 5 | 8.4 | 78 | 644 | 5.6 | 1 | 14 | 7 | 8.55 |
| Example 36 | 1 | 20 | 10 | 8.4 | 78 | 593 | 5.4 | 1 | 30 | 15 | 8.55 |
| Example 37 | 1 | 12.6 | 6.3 | 8.4 | 78 | 522 | 4.9 | 1 | 30 | 15 | 8.55 |
| Example 38 | 1 | 3.8 | 1.9 | 8.4 | 78 | 647 | 5.1 | 1 | 30 | 15 | 8.55 |
| Example 39 | 1 | 17 | 8.5 | 8.4 | 78 | 624 | 4.2 | 1 | 30 | 15 | 8.55 |
| Example 40 | 1 | 10 | 5 | 8.4 | 78 | 558 | 5 | 1 | 30 | 15 | 8.55 |
| Example 41 | 1 | 10 | 5 | 8.4 | 78 | 551 | 4.9 | 1 | 30 | 15 | 8.55 |
| Example 42 | 1 | 10 | 5 | 8.4 | 78 | 676 | 4.6 | 1 | 30 | 15 | 8.55 |
| Example 43 | 1 | 10 | 5 | 8.4 | 78 | 606 | 5.4 | 1 | 30 | 15 | 8.55 |
| Example 44 | 1 | 10 | 5 | 8.4 | 78 | 630 | 4.4 | 1 | 30 | 15 | 8.55 |
| Example 45 | 1 | 10 | 5 | 8.4 | 78 | 576 | 3.8 | 1 | 30 | 15 | 8.55 |
| Example 46 | 1 | 4 | 2 | 8.4 | 78 | 569 | 4.9 | 1 | 30 | 15 | 8.55 |
| Example 47 | 1 | 6 | 3 | 8.4 | 78 | 592 | 6.8 | 1 | 30 | 15 | 8.55 |
| Example 48 | 1 | 20 | 10 | 8.4 | 78 | 628 | 5.6 | 1 | 30 | 15 | 8.55 |
| Example 49 | 1 | 22 | 11 | 8.4 | 78 | 589 | 5.1 | 1 | 30 | 15 | 8.55 |
| Comparative Example 1 | 1 | 10 | 5 | 8.4 | 78 | 612 | 5.1 | 1 | 30 | 15 | 8.55 |
| Comparative Example 2 | 1 | 10 | 5 | 8.4 | 78 | 539 | 6 | 1 | 30 | 15 | 8.55 |
| Comparative Example 3 | 1 | 10 | 5 | 8.4 | 78 | 597 | 5 | C1 | 30 | 15 | 8.55 |
| Comparative Example 4 | 1 | 10 | 5 | 8.4 | 78 | 688 | 5.7 | C2 | 30 | 15 | 8.55 |
| Comparative Example 5 | 1 | 10 | 5 | 8.4 | 78 | 553 | 4.7 | 7 | 30 | 15 | 8.55 |
| Comparative Example 6 | 1 | 25 | 5 | 8.4 | 78 | 576 | 5.7 | 8 | 75 | 15 | 8.55 |

TABLE 2-3-1

| | Dynamic rheological parameters | | | | | | | | |
|---|---|---|---|---|---|---|---|---|---|
| | Toner particles | | | StAc-PO polycondensate | | LOG10(G'SP(70)) − LOG10(G'SP(90)) | LOG10(G'T(70)) − LOG10(G'SP(70)) | LOG10(G'T(90)) − LOG10(G'SP(90)) | |
| | G'T(70) Pa | G'T(90) Pa | tanδ Td ° C. | G'SP(70) Pa | G'SP(90) Pa | Pa | Pa | Pa | \|Td − Tw\| ° C. |
| Example 1 | 2.0E+05 | 2.4E+04 | 57 | 2.1E+06 | 2.1E+04 | 2.00 | −1.02 | 0.06 | 21 |
| Example 2 | 8.1E+04 | 1.2E+04 | 55 | 6.1E+05 | 6.5E+03 | 1.97 | −0.88 | 0.27 | 23 |
| Example 3 | 6.8E+05 | 5.5E+04 | 58 | 8.1E+04 | 4.1E+03 | 1.30 | 0.92 | 1.13 | 20 |
| Example 4 | 1.2E+04 | 1.3E+03 | 54 | 2.1E+06 | 2.1E+04 | 2.00 | −2.24 | −1.21 | 24 |
| Example 5 | 8.8E+05 | 9.1E+04 | 58 | 2.1E+06 | 2.1E+04 | 2.00 | −0.38 | 0.64 | 20 |
| Example 6 | 7.0E+05 | 2.4E+04 | 58 | 1.8E+04 | 1.6E+03 | 1.05 | 1.59 | 1.18 | 20 |
| Example 7 | 2.0E+05 | 2.4E+04 | 57 | 8.5E+06 | 8.9E+05 | 0.98 | −1.63 | −1.57 | 21 |
| Example 8 | 7.1E+05 | 4.1E+04 | 59 | 3.5E+05 | 2.2E+04 | 1.20 | −0.31 | −0.27 | 19 |
| Example 9 | 7.1E+05 | 2.3E+04 | 58 | 8.9E+06 | 1.8E+03 | 3.70 | 1.10 | −1.11 | 20 |
| Example 10 | 1.8E+04 | 5.5E+03 | 56 | 8.9E+06 | 4.8E+05 | 1.27 | −2.70 | 1.94 | 22 |
| Example 11 | 7.6E+05 | 5.5E+04 | 58 | 1.2E+04 | 1.3E+03 | 0.97 | 1.80 | −1.63 | 20 |
| Example 12 | 2.5E+04 | 1.4E+03 | 55 | 8.8E+06 | 9.1E+05 | 0.99 | −2.55 | −2.80 | 23 |
| Example 13 | 5.1E+05 | 8.7E+04 | 57 | 5.1E+05 | 1.1E+03 | 2.67 | 0.00 | 1.90 | 21 |
| Example 14 | 3.4E+04 | 5.2E+03 | 43 | 2.1E+06 | 2.1E+04 | 2.00 | −1.79 | −0.61 | 35 |
| Example 15 | 3.1E+04 | 6.3E+03 | 42 | 2.1E+06 | 2.1E+04 | 2.00 | −1.83 | −0.52 | 36 |
| Example 16 | 5.1E+05 | 6.1E+04 | 58 | 3.5E+05 | 2.1E+04 | 1.22 | 0.16 | 0.46 | 20 |
| Example 17 | 4.2E+05 | 7.3E+04 | 58 | 3.5E+05 | 2.1E+04 | 1.22 | 0.08 | 0.54 | 20 |
| Example 18 | 8.1E+04 | 8.1E+03 | 55 | 3.5E+05 | 2.1E+04 | 1.22 | −0.64 | −0.41 | 23 |
| Example 19 | 6.8E+04 | 7.7E+04 | 56 | 3.5E+05 | 2.1E+04 | 1.22 | −0.71 | 0.56 | 22 |
| Example 20 | 2.2E+05 | 2.3E+04 | 57 | 3.5E+05 | 2.1E+04 | 1.22 | −0.20 | 0.04 | 21 |
| Example 21 | 1.8E+05 | 2.2E+04 | 57 | 3.5E+05 | 2.1E+04 | 1.22 | −0.29 | 0.02 | 21 |
| Example 22 | 8.9E+04 | 1.0E+03 | 56 | 2.1E+06 | 2.1E+04 | 2.00 | −1.37 | −1.32 | 22 |
| Example 23 | 1.2E+05 | 3.5E+03 | 58 | 2.1E+06 | 2.1E+04 | 2.00 | −1.24 | −0.78 | 20 |
| Example 24 | 2.2E+05 | 4.1E+03 | 58 | 2.1E+06 | 2.1E+04 | 2.00 | −0.98 | −0.71 | 20 |
| Example 25 | 3.1E+05 | 6.6E+03 | 57 | 2.1E+06 | 2.1E+04 | 2.00 | −0.83 | −0.50 | 21 |

TABLE 2-3-1-continued

| | Dynamic rheological parameters | | | | | | | | |
|---|---|---|---|---|---|---|---|---|---|
| | Toner particles | | | StAc-PO polycondensate | | LOG10(G'SP(70)) − | LOG10(G'T(70)) − | LOG10(G'T(90)) − | |
| | G'T(70) Pa | G'T(90) Pa | tanδ Td ° C. | G'SP(70) Pa | G'SP(90) Pa | LOG10(G'SP(90)) Pa | LOG10(G'SP(70)) Pa | LOG10(G'SP(90)) Pa | \|Td − Tw\| ° C. |
| Example 26 | 9.1E+04 | 1.0E+04 | 55 | 2.1E+06 | 2.1E+04 | 2.00 | −1.36 | −0.32 | 23 |
| Example 27 | 1.2E+05 | 1.2E+04 | 56 | 2.1E+06 | 2.1E+04 | 2.00 | −1.24 | −0.24 | 22 |
| Example 28 | 6.5E+05 | 3.2E+04 | 57 | 2.1E+06 | 2.1E+04 | 2.00 | −0.51 | 0.18 | 21 |
| Example 29 | 3.1E+05 | 5.8E+03 | 55 | 2.1E+06 | 2.1E+04 | 2.00 | −0.83 | −0.56 | 23 |

TABLE 2-3-2

| | Dynamic rheological parameters | | | | | | | | |
|---|---|---|---|---|---|---|---|---|---|
| | Toner particles | | | StAc-PO polycondensate | | LOG10(G'SP(70)) − | LOG10(G'T(70)) − | LOG10(G'T(90)) − | |
| | G'T(70) Pa | G'T(90) Pa | tanδ Td ° C. | G'SP(70) Pa | G'SP(90) Pa | LOG10(G'SP(90)) Pa | LOG10(G'SP(70)) Pa | LOG10(G'SP(90)) Pa | \|Td − Tw\| ° C. |
| Example 30 | 1.8E+05 | 9.1E+03 | 56 | 2.1E+06 | 2.1E+04 | 2.00 | −1.07 | −0.36 | 22 |
| Example 31 | 2.6E+05 | 3.7E+03 | 57 | 2.1E+06 | 2.1E+04 | 2.00 | −0.91 | −0.75 | 21 |
| Example 32 | 3.2E+05 | 1.2E+04 | 56 | 2.1E+06 | 2.1E+04 | 2.00 | −0.82 | −0.24 | 22 |
| Example 33 | 4.1E+05 | 2.3E+04 | 57 | 2.1E+06 | 2.1E+04 | 2.00 | −0.71 | 0.04 | 21 |
| Example 34 | 2.2E+05 | 3.5E+04 | 57 | 2.1E+06 | 2.1E+04 | 2.00 | −0.98 | 0.22 | 21 |
| Example 35 | 2.6E+05 | 2.1E+04 | 57 | 2.1E+06 | 2.1E+04 | 2.00 | −0.91 | 0.00 | 21 |
| Example 36 | 2.8E+05 | 3.5E+04 | 57 | 2.1E+06 | 2.1E+04 | 2.00 | −0.88 | 0.22 | 21 |
| Example 37 | 2.1E+05 | 4.1E+04 | 57 | 2.1E+06 | 2.1E+04 | 2.00 | −1.00 | 0.29 | 21 |
| Example 38 | 5.0E+04 | 3.5E+03 | 58 | 2.1E+06 | 2.1E+04 | 2.00 | −1.62 | −0.78 | 20 |
| Example 39 | 4.1E+04 | 5.1E+03 | 54 | 2.1E+06 | 2.1E+04 | 2.00 | −1.71 | −0.61 | 24 |
| Example 40 | 3.2E+04 | 3.2E+03 | 55 | 2.1E+06 | 2.1E+04 | 2.00 | −1.82 | −0.82 | 23 |
| Example 41 | 2.1E+04 | 2.9E+03 | 54 | 2.1E+06 | 2.1E+04 | 2.00 | −2.00 | −0.86 | 24 |
| Example 42 | 5.8E+05 | 4.1E+04 | 58 | 2.1E+06 | 2.1E+04 | 2.00 | −0.56 | 0.29 | 20 |
| Example 43 | 4.1E+05 | 3.6E+04 | 57 | 2.1E+06 | 2.1E+04 | 2.00 | −0.71 | 0.23 | 21 |
| Example 44 | 2.5E+04 | 2.3E+03 | 54 | 2.1E+06 | 2.1E+04 | 2.00 | −1.92 | −0.96 | 24 |
| Example 45 | 1.6E+04 | 1.2E+03 | 54 | 2.1E+06 | 2.1E+04 | 2.00 | −2.12 | −1.24 | 24 |
| Example 46 | 3.1E+05 | 8.1E+03 | 58 | 2.1E+06 | 2.1E+04 | 2.00 | −0.83 | −0.41 | 20 |
| Example 47 | 2.9E+05 | 3.1E+04 | 57 | 2.1E+06 | 2.1E+04 | 2.00 | −0.86 | 0.17 | 21 |
| Example 48 | 2.1E+05 | 3.2E+04 | 57 | 2.1E+06 | 2.1E+04 | 2.00 | −1.00 | 0.18 | 21 |
| Example 49 | 2.0E+05 | 2.4E+04 | 56 | 2.1E+06 | 2.1E+04 | 2.00 | −1.02 | 0.06 | 22 |
| Comparative Example 1 | 8.9E+03 | 8.2E+02 | 53 | 2.1E+06 | 2.1E+04 | 2.00 | −2.37 | −1.41 | 25 |
| Comparative Example 2 | 2.2E+06 | 2.3E+05 | 57 | 2.1E+06 | 2.1E+04 | 2.00 | 0.02 | 1.04 | 21 |
| Comparative Example 3 | 7.1E+03 | 4.7E+02 | 57 | 7.9E+03 | 8.6E+02 | 0.96 | −0.05 | −0.26 | 21 |
| Comparative Example 4 | 3.5E+05 | 5.1E+04 | 58 | 2.0E+07 | 2.1E+06 | 0.98 | −1.76 | −1.61 | 20 |
| Comparative Example 5 | 1.2E+06 | 2.8E+05 | 57 | 8.9E+06 | 1.8E+03 | 3.70 | −0.87 | 2.20 | 21 |
| Comparative Example 6 | 5.1E+03 | 3.8E+02 | 54 | 8.9E+06 | 4.8E+05 | 1.27 | −3.24 | −3.10 | 24 |

TABLE 2-4-1

| | Solubility parameters | | Content ratios | | Testing | |
|---|---|---|---|---|---|---|
| | \|SP1 − SP2\| | \|SP2 − SP3\| | $C_{SP}/C_{AC}$ | $C_{SP}/C_w$ | Fixation at low temperatures | Suitability for postprocessing |
| Example 1 | 1.06 | 1.21 | 0.20 | 3.0 | G1 | A |
| Example 2 | 1.06 | 1.21 | 0.20 | 3.0 | G1 | B |
| Example 3 | 1.06 | 1.21 | 0.20 | 3.0 | G2 | A |
| Example 4 | 1.06 | 1.21 | 0.20 | 3.0 | G1 | B |
| Example 5 | 1.06 | 1.21 | 0.20 | 3.0 | G2 | B |
| Example 6 | 1.06 | 1.21 | 0.20 | 3.0 | G2 | B |
| Example 7 | 1.06 | 1.21 | 0.20 | 3.0 | G2 | B |
| Example 8 | 1.06 | 1.21 | 0.20 | 3.0 | G2 | B |
| Example 9 | 1.06 | 1.21 | 0.20 | 3.0 | G2 | B |

TABLE 2-4-1-continued

| | Solubility parameters | | Content ratios | | Testing | |
|---|---|---|---|---|---|---|
| | \|SP1 − SP2\| | \|SP2 − SP3\| | $C_{SP}/C_{AC}$ | $C_{SP}/C_w$ | Fixation at low temperatures | Suitability for postprocessing |
| Example 10 | 1.06 | 1.21 | 0.20 | 3.0 | G1 | B |
| Example 11 | 1.06 | 1.21 | 0.20 | 3.0 | G2 | B |
| Example 12 | 1.06 | 1.21 | 0.20 | 3.0 | G1 | B |
| Example 13 | 1.06 | 1.21 | 0.20 | 3.0 | G2 | B |
| Example 14 | 1.06 | 1.21 | 0.20 | 3.0 | G2 | B |
| Example 15 | 1.06 | 1.21 | 0.20 | 3.0 | G2 | C |
| Example 16 | 1.06 | 1.21 | 0.20 | 3.0 | G2 | C |
| Example 17 | 1.06 | 1.21 | 0.20 | 3.0 | G2 | B |
| Example 18 | 1.06 | 1.21 | 0.20 | 3.0 | G2 | B |
| Example 19 | 1.06 | 1.21 | 0.20 | 3.0 | G2 | C |
| Example 20 | 1.06 | 1.21 | 0.20 | 3.0 | G2 | B |
| Example 21 | 1.06 | 1.21 | 0.20 | 3.0 | G2 | C |
| Example 22 | 0.75 | 1.21 | 0.18 | 3.0 | G1 | C |
| Example 23 | 0.83 | 1.21 | 0.21 | 3.0 | G2 | B |
| Example 24 | 1.18 | 1.21 | 0.21 | 3.0 | G2 | B |
| Example 25 | 1.24 | 1.21 | 0.22 | 3.0 | G2 | C |
| Example 26 | 0.76 | 0.91 | 0.19 | 3.0 | G1 | C |
| Example 27 | 0.91 | 1.05 | 0.18 | 3.0 | G2 | B |
| Example 28 | 1.11 | 1.26 | 0.22 | 3.0 | G3 | B |
| Example 29 | 1.18 | 1.34 | 0.21 | 3.0 | G2 | C |

TABLE 2-4-2

| | Solubility parameters | | Content ratios | | Testing | |
|---|---|---|---|---|---|---|
| | \|SP1 − SP2\| | \|SP2 − SP3\| | $C_{SP}/C_{AC}$ | $C_{SP}/C_w$ | Fixation at low temperatures | Suitability for postprocessing |
| Example 30 | 1.06 | 1.21 | 0.09 | 1.2 | G1 | C |
| Example 31 | 1.06 | 1.21 | 0.1 | 1.5 | G2 | B |
| Example 32 | 1.06 | 1.21 | 0.34 | 5.0 | G2 | B |
| Example 33 | 1.06 | 1.21 | 0.38 | 5.6 | G2 | C |
| Example 34 | 1.06 | 1.21 | 0.12 | 0.91 | G2 | C |
| Example 35 | 1.06 | 1.21 | 0.09 | 1.12 | G2 | B |
| Example 36 | 1.06 | 1.21 | 0.20 | 7.85 | G2 | B |
| Example 37 | 1.06 | 1.21 | 0.20 | 8.1 | G1 | C |
| Example 38 | 1.06 | 1.21 | 0.32 | 7.9 | G2 | C |
| Example 39 | 1.06 | 1.21 | 0.29 | 1.8 | G2 | B |
| Example 40 | 1.06 | 1.21 | 0.17 | 3.0 | G2 | B |
| Example 41 | 1.06 | 1.21 | 0.16 | 3.0 | G2 | C |
| Example 42 | 1.06 | 1.21 | 0.23 | 3.0 | G2 | C |
| Example 43 | 1.06 | 1.21 | 0.22 | 3.0 | G2 | B |
| Example 44 | 1.06 | 1.21 | 0.16 | 3.0 | G2 | B |
| Example 45 | 1.06 | 1.21 | 0.16 | 3.0 | G1 | C |
| Example 46 | 1.06 | 1.21 | 0.20 | 7.5 | G1 | C |
| Example 47 | 1.06 | 1.21 | 0.20 | 5.0 | G2 | B |
| Example 48 | 1.06 | 1.21 | 0.20 | 1.5 | G2 | B |
| Example 49 | 1.06 | 1.21 | 0.20 | 1.4 | G2 | C |
| Comparative Example 1 | 1.06 | 1.21 | 0.17 | 3.0 | G2 | D |
| Comparative Example 2 | 1.06 | 1.21 | 0.23 | 3.0 | G4 | D |
| Comparative Example 3 | 1.06 | 1.21 | 0.19 | 3.0 | G3 | D |
| Comparative Example 4 | 1.06 | 1.21 | 0.22 | 3.0 | G3 | D |
| Comparative Example 5 | 1.06 | 1.21 | 0.22 | 3.0 | G3 | D |
| Comparative Example 6 | 1.06 | 1.21 | 0.20 | 3.0 | G2 | D |

As can be seen from the results, the toners of the Examples, compared with those of the Comparative Examples, may be fixable at low temperatures and may help reduce variations in gloss after postprocessing of the fixed toner image at the same time.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A toner for developing an electrostatic charge image, the toner comprising:

toner particles that contain binder resins including an amorphous polyester resin and a crystalline polyester resin, an ester-based release agent, and a polycondensate of a styrene-acrylic resin and a polyolefin resin, wherein:

the toner particles have a storage modulus $G'_T$ (70) at 70° C. of $1\times10^4$ Pa or more and $1\times10^6$ Pa or less and a storage modulus $G'_T$ (90) at 90° C. of $1\times10^3$ Pa or more and $1\times10^5$ Pa or less in dynamic rheometry; and the polycondensate of styrene-acrylic and polyolefin resins has a storage modulus $G'_{SP}$ (70) at 70° C. of $1\times10^4$ Pa or more and $1\times10^7$ Pa or less and a storage modulus $G'_{SP}$ (90) at 90° C. of $1\times10^3$ Pa or more and $1\times10^6$ Pa or less in dynamic rheometry.

2. The toner according to claim 1 for developing an electrostatic charge image, wherein:

a difference between common logarithms of the storage modulus $G'_{SP}$ (70) at 70° C. and the storage modulus $G'_{SP}$ (90) at 90° C. of the polycondensate of styrene-acrylic and polyolefin resins in dynamic rheometry, $Log_{10}G'_{SP}$ (70)−$Log_{10}G'_{SP}$ (90), is 1.0 or more and 4.0 or less;

a difference between common logarithms of the storage modulus $G'_{SP}$ (70) at 70° C. of the polycondensate of styrene-acrylic and polyolefin resins in dynamic rheometry and the storage modulus $G'_T$ (70) at 70° C. of the toner particles in dynamic rheometry, $Log_{10}G'_T$ (70)−$Log_{10}G'_{SP}$ (70), is −3.0 or more and 2.0 or less; and a difference between common logarithms of the storage modulus $G'_{SP}$ (90) at 90° C. of the polycondensate of styrene-acrylic and polyolefin resins in dynamic rheometry and the storage modulus $G'_T$ (90) at 90° C. of the toner particles in dynamic rheometry, $Log_{10}G'T$ (90)−$Log_{10}G'_{SP}$ (90), is −3.0 or more and 2.0 or less.

3. The toner according to claim 1 for developing an electrostatic charge image, wherein $10\leq|Td-Tw|\leq30$, where Td represents a temperature in dynamic rheometry of the toner particles at which a loss tangent tan δ of the toner particles peaks, and Tw represents a melting temperature of the ester-based release agent.

4. The toner according to claim 1 for developing an electrostatic charge image, wherein in a cross-sectional observation of the toner particles, a diameter of domains of the ester-based release agent is 100 nm or more and 800 nm or less.

5. The toner according to claim 1 for developing an electrostatic charge image, wherein in a cross-sectional observation of the toner particles, a percentage area of the ester-based release agent in a surface layer of the toner particles is 10% or less.

6. The toner according to claim 1 for developing an electrostatic charge image, wherein $0.8\leq|SP1-SP2|\leq1.2$, where SP1 represents a solubility parameter of the styrene-acrylic resin in the polycondensate of styrene-acrylic and polyolefin resins, and SP2 represents an average solubility parameter of the amorphous and crystalline polyester resins.

7. The toner according to claim 6 for developing an electrostatic charge image, wherein $1.0\leq|SP2-SP3|\leq1.3$, where SP2 represents an average solubility parameter of the amorphous and crystalline polyester resins, and SP3 represents a solubility parameter of the ester-based release agent.

8. The toner according to claim 1 for developing an electrostatic charge image, wherein a ratio by mass between a total amorphous and crystalline polyester resins content $C_{AC}$ and a styrene-acrylic polyolefin polycondensate content $C_{SP}$, $C_{SP}/C_{AC}$, is 0.1 or more and 0.35 or less.

9. The toner according to claim 1 for developing an electrostatic charge image, wherein a ratio by mass between an ester-based release agent content $C_W$ and a styrene-acrylic polyolefin polycondensate content $C_{SP}$, $C_{SP}/C_W$, is 1.0 or more and 8.0 or less.

10. The toner according to claim 8 for developing an electrostatic charge image, wherein the total amorphous and crystalline polyester resins content $C_{AC}$ is 50% by mass or more and 90% by mass or less of the toner particles.

11. The toner according to claim 8 for developing an electrostatic charge image, wherein a crystalline polyester resin content $C_C$ is 4% by mass or more and 30% by mass or less of the toner particles.

12. The toner according to claim 8 for developing an electrostatic charge image, wherein an ester-based release agent content $C_W$ is 3% by mass or more and 10% by mass or less of the toner particles.

13. The toner according to claim 8 for developing an electrostatic charge image, wherein the styrene-acrylic polyolefin polycondensate content $C_{SP}$ is 2% by mass or more and 20% by mass or less of the toner particles.

14. An electrostatic charge image developer comprising the toner according to claim 1 for developing an electrostatic charge image.

15. A toner cartridge attachable to and detachable from an image forming apparatus, the toner cartridge comprising the toner according to claim 1 for developing an electrostatic charge image.

16. A process cartridge attachable to and detachable from an image forming apparatus, the process cartridge comprising a developing component that contains the electrostatic charge image developer according to claim 14 and develops, using the electrostatic charge image developer, an electrostatic charge image on a surface of an image carrier to form a toner image.

17. An image forming apparatus comprising:

an image carrier;

a charging component that charges a surface of the image carrier;

an electrostatic charge image creating component that creates an electrostatic charge image on the charged surface of the image carrier;

a developing component that contains the electrostatic charge image developer according to claim 14 and develops, using the electrostatic charge image developer, the electrostatic charge image on the surface of the image carrier to form a toner image;

a transfer component that transfers the toner image on the surface of the image carrier to a surface of a recording medium; and a fixing component that fixes the toner image on the surface of the recording medium.

* * * * *